(12) United States Patent
Porter

(10) Patent No.: US 9,126,689 B2
(45) Date of Patent: Sep. 8, 2015

(54) VEHICLE PASSENGER SEATING

(71) Applicant: AIR NEW ZEALAND LIMITED, Auckland (NZ)

(72) Inventor: Glen Wilson Porter, Christchurch (NZ)

(73) Assignee: Air New Zealand Limited, Auckland (NZ)

( * ) Notice: Subject to any disclaimer, the term of this patent is extended or adjusted under 35 U.S.C. 154(b) by 248 days.

(21) Appl. No.: 13/892,617

(22) Filed: May 13, 2013

(65) Prior Publication Data

US 2014/0159440 A1  Jun. 12, 2014

Related U.S. Application Data

(63) Continuation of application No. 12/729,335, filed on Mar. 23, 2010, now abandoned.

(60) Provisional application No. 61/298,048, filed on Jan. 25, 2010.

(30) Foreign Application Priority Data

Mar. 23, 2009 (NZ) ................................ 2009901289
Dec. 8, 2009 (NZ) ................................ 2009905968
Dec. 22, 2009 (NZ) ................................ 2009906218
Jan. 12, 2010 (NZ) ................................ 2010900087

(51) Int. Cl.
*B64D 11/06* (2006.01)
*B60N 2/01* (2006.01)
*B60N 2/46* (2006.01)
(Continued)

(52) U.S. Cl.
CPC .............. *B64D 11/0646* (2014.12); *B60N 2/01* (2013.01); *B60N 2/464* (2013.01); *B60N 2/468* (2013.01); *B60N 2/4686* (2013.01); *B60N 2/4876* (2013.01); *B60N 3/001* (2013.01); *B60N 3/002* (2013.01); *B60N 3/004* (2013.01); *B60R 7/043* (2013.01); *B64D 11/0015* (2013.01); *B64D 11/06* (2013.01); *B64D 11/0601* (2014.12); *B64D 11/064* (2014.12); *B64D 11/0604* (2014.12); *B64D 11/0606* (2014.12);
(Continued)

(58) Field of Classification Search
CPC ........... B64D 11/0646; B64D 11/0644; B64D 11/0601; B60N 2/464; B60N 2/01; B60N 2/468
See application file for complete search history.

(56) References Cited

U.S. PATENT DOCUMENTS 2,414,730 A   1/1947  Flogaus
2,947,349 A   8/1960  Kryter
(Continued)

FOREIGN PATENT DOCUMENTS

AU   2007201819   5/2007
CN   1132711      10/1996
(Continued)

*Primary Examiner* — Brian M O'Hara
(74) *Attorney, Agent, or Firm* — Dann, Dorfman, Herrell and Skillman, P.C.

(57) ABSTRACT

A seating arrangement for location at the longitudinal center line of a commercial passenger vehicle that has a longitudinally extending passenger seating area. The seating arrangement includes a pair of seats disposed alongside and secured to each other. Each seat comprising a backrest portion, and a seat pan portion, wherein the seats face at an acute angle to each other, and wherein the backrest portions of the respective seats are nearest the vertex of the acute angle than the seat pan portions.

25 Claims, 31 Drawing Sheets

(51) Int. Cl.
  B60N 2/48 (2006.01)
  B60N 3/00 (2006.01)
  B64D 11/00 (2006.01)
  B60R 7/04 (2006.01)
  B60N 2/44 (2006.01)

(52) U.S. Cl.
  CPC ........ B64D11/0636 (2014.12); B64D 11/0638 (2014.12); *B60N 2002/4405* (2013.01)

(56) References Cited

U.S. PATENT DOCUMENTS

| | | | |
|---|---|---|---|
| 3,541,742 | A | 11/1970 | Harper |
| 3,730,583 | A | 5/1973 | Colovas et al. |
| 4,382,628 | A | 5/1983 | Palmgren |
| 4,685,729 | A * | 8/1987 | Heesch et al. ........... 297/188.09 |
| 4,936,620 | A | 6/1990 | Francois et al. |
| 5,547,247 | A | 8/1996 | Dixon |
| 5,992,798 | A | 11/1999 | Ferry |
| 6,059,364 | A | 5/2000 | Dryburgh et al. |
| 6,435,609 | B1 * | 8/2002 | Gasser ....................... 297/188.1 |
| 6,742,842 | B2 | 6/2004 | Dowty |
| 6,793,282 | B2 | 9/2004 | Plant et al. |
| 7,025,306 | B2 | 4/2006 | Saint Jalmes |
| 7,201,439 | B2 | 4/2007 | Schweizer |
| 7,252,332 | B2 | 8/2007 | Thompson |
| 7,419,214 | B2 * | 9/2008 | Plant ............................ 297/245 |
| 7,448,575 | B2 | 11/2008 | Cheung et al. |
| 8,864,071 | B2 * | 10/2014 | Vergnaud et al. .......... 244/118.6 |
| 2001/0003962 | A1 | 6/2001 | Park et al. |
| 2003/0184957 | A1 | 10/2003 | Stahl et al. |
| 2004/0232283 | A1 | 11/2004 | Ferry et al. |
| 2007/0034742 | A1 | 2/2007 | Jaeger et al. |
| 2007/0040434 | A1 | 2/2007 | Plant |
| 2007/0069073 | A1 * | 3/2007 | Ferry et al. ................. 244/118.6 |
| 2007/0102577 | A1 | 5/2007 | Saint-Jalmes et al. |
| 2007/0145187 | A1 | 6/2007 | Beroth |
| 2007/0241232 | A1 | 10/2007 | Thompson |
| 2007/0246981 | A1 | 10/2007 | Plant |
| 2008/0042010 | A1 | 2/2008 | Watanabe |
| 2008/0295863 | A1 | 12/2008 | Kappler |
| 2009/0050740 | A1 | 2/2009 | Saint-Jalmes et al. |
| 2009/0152907 | A1 | 6/2009 | Lee |
| 2009/0195037 | A1 * | 8/2009 | Plavetich et al. ............. 297/257 |
| 2010/0065684 | A1 | 3/2010 | Ruiter et al. |

FOREIGN PATENT DOCUMENTS

| | | |
|---|---|---|
| CN | 1460611 | 12/2003 |
| CN | 1824535 | 8/2006 |
| DE | 3436509 | 4/1986 |
| DE | 10259122 | 7/2004 |
| DE | 102006056898 | 6/2008 |
| EP | 0346299 | 12/1989 |
| EP | 0547362 | 6/1993 |
| EP | 1116654 | 7/2001 |
| EP | 1314643 | 5/2003 |
| EP | 1495908 | 12/2005 |
| EP | 2154068 | 2/2010 |
| GB | 2288728 | 11/1995 |
| GB | 2326824 | 1/1999 |
| GB | 2362095 | 11/2001 |
| GB | 2405791 | 3/2005 |
| GB | 2437164 | 10/2007 |
| GB | 2438162 | 11/2007 |
| JP | 2000062507 | 2/2000 |
| JP | 2004066959 | 3/2004 |
| WO | 0002745 | 1/2000 |
| WO | 2005077758 | 8/2005 |
| WO | 2008046027 | 4/2008 |
| WO | 2008072328 | 6/2008 |
| WO | 2009064519 | 5/2009 |
| WO | 2009073244 | 6/2009 |
| WO | 2009101294 | 8/2009 |

* cited by examiner

VEHICLE PASSENGER SEATING

CROSS REFERENCE TO RELATED APPLICATIONS

This application is a continuation of U.S. application Ser. No. 12/729,335, filed on Mar. 23, 2010, which claims the benefit of priority of U.S. Provisional Application No. 61/298,048, filed on Jan. 25, 2010, the entireties of which are incorporated herein by reference.

FIELD OF THE INVENTION

The present invention relates to a seating arrangement, seats and seating in or for passenger transport vehicles. More particularly but not exclusively it relates to seating in or for an aircraft.

BACKGROUND TO THE INVENTION

Commercial passenger airlines typically aim to optimise seating on their aircraft to increase the comfort of passengers, yet achieving a high density of passengers per unit of floor area or for a given aircraft cabin volume.

Typically seats in an aircraft are arranged so that passengers seated on the seats face in a direction parallel with the fore-aft direction of the aircraft. This has been the situation for seats in first class, business class, premium economy and economy sections in the aircraft for many years. For example seats are arranged in rows all facing forwards.

One of the problems associated with these seating configurations is that passengers end up sitting shoulder to shoulder. This may be awkward for larger passengers in particulars.

Another problem associated with such seating configurations is that passengers are afforded little privacy.

More recently seating arrangements have been arranged to offer the individual more privacy and allow for more convenient and comfortable seating of passengers, while attempting to maximise passenger density.

One such example of more recent proposed seating arrangements is the seating arrangement shown in United States patent application US2007/0069073 by Ferry et al. This publication shows a seating layout wherein the seats do not face directly forwardly and seated passengers face at an acute angle to the fore-aft direction of the aircraft.

The seats are arranged as single units and occupy a relatively large amount of space. They are also designed with privacy in mind and do not facilitate interaction with passengers in seats adjacent.

Such seats are typically intended to be used in first or business class sections of an aircraft.

United States patent application US2007/0246981 by Plant shows a different seating arrangement. In this arrangement two seats are located side by side and are angled at an acute angle relative to the fore-aft direction line of the aircraft such that the seats face partly inwardly towards each other.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

Accordingly in a first aspect the present invention may be said to be a seating arrangement for location at the longitudinal centre line of a commercial passenger vehicle in a longitudinally extending passenger seating area thereof, said seating arrangement comprising;

a pair of seats disposed alongside and secured to each other, each seat comprising
a backrest portion, and
a seat pan portion,
wherein said seats face at an acute angle to each other, and
wherein the backrest portions of the respective seats are nearest the vertex of the acute angle than the seat pan portions.

Preferably the seat pan portions of each seat are separated from each other and an armrest is located between the seat pan portions of the pair of seats.

Preferably the armrest is configured to be presented for mutual use by passengers sedentary in the pair of seats.

Preferably the seating arrangement includes a utility surface located between the seat pan portions of the pair of seats.

Preferably the utility surface is supported by a base structure in a manner to be movable between a raised position and a lowered position.

Preferably the utility surface when in its raised position is configured for a passenger sedentary in one or each of the respective seats to rest their arm on.

Preferably the utility surface when in its lowered position and together with the seat pans of each seat, form a surface (preferably flat) for a passenger to recline on.

Preferably the utility surface when in its lowered position and together with the seat pans of each seat, defines a continuous support surface.

Preferably the utility surface, when in its raised position, allows passengers sitting in the two seats to position their feet under the utility surface in order to sit in an orientation facing towards each other.

Preferably the utility surface is movable between its raised and lowered positions by said base structure, said base structure configured to not prevent sedentary passengers legs from swinging into and out of a region underneath the utility surface when the utility surface is in the raised position.

Preferably the utility surface is movable by said base structure that is movably supported by a sliding mechanism.

Preferably a backrest is disposed between the backrest portions of the two seats, presented for use by a passenger sitting on the utility surface when in its lowered position.

Preferably a secondary seat pan in provided, positioned intermediate of and spanning between the seat pans of the two seats when in a first position, there being a void below said secondary seat pan, the secondary seat pan moveable between said first and a second, more elevated, position such that in said second position, the secondary seat pan is separated from the seat pans of the two seats to create a gap sufficient to receive at least one thigh of a person sitting in each of the two seats.

Preferably the seating arrangement further comprises a securing assembly configured to secure the seats to a floor of a said commercial passenger vehicle in a manner so that the seats are aligned at an acute angle towards each other and are each at an acute angle with respect to the longitudinal axis of the vehicle and each face towards opposed outboard directions.

Preferably the seating arrangement further comprises a shell that extends at least in part around the rear of both seats.

Preferably the shell is composed of a rigid moulded plastic material.

Preferably the shell defines a recess for accommodating a visual display unit to be presented for viewing by a passenger seated behind the seating arrangement.

Preferably the shell defines at least one armrest for each seat.

Preferably the shell defines at least one foot well to accommodate the feet of a passenger sitting behind the seating arrangement.

Preferably the foot well is of a shape to allow a passenger sitting behind the seating arrangement to position their feet below the seat pan of a seat in front.

Preferably, the armrest is defined on the outboard side of at least one seat of the central seat arrangement.

Preferably the central seat arrangement includes at least one tray table extending outwardly from the rear of the shell to provide a convenient utility surface for passengers seated behind the central seat arrangement.

Preferably said shell extends from floor level and projects above the backrest portion of each seat.

Preferably said shell extends to present a secondary back rest for sedentary passengers in each seat for use by each passenger when positioned to face more towards the other seat in the seating arrangement.

Preferably said shell extends to project at least in part to the facing side of each seat to define flanking on each side of seating arrangement.

Preferably each said seat faces at an angle relative to the longitudinal direction of between 15 to 30 degrees and preferably 23 degrees.

Preferably said seats face at an angle relative to each other of between 30 to 60 degrees and preferably 46 degrees.

Preferably a privacy screen is positioned between the two seats.

Preferably, the privacy screen is fixed in position relative to the shell.

Preferably, the privacy screen extends from the shell.

Preferably, the privacy screen is defined by the shell.

Preferably each seat is moveable between an upright seated and a more reclined position.

Preferably one or both of the backrest portion and seat pan portion is moveable between an upright seated position and a more reclined position.

Preferably each said seat pan portion includes a front edge and a rearward edge.

Preferably, the seat pan portion of said seat drops at its rearward edge when moving to its reclined more position.

Preferably, the seat pan portion raises at its front edge when moving into its reclined position.

Preferably said seats are connected to each other and form a unitary pair of seats.

Preferably the seating arrangement is installed along the longitudinal centre line of a commercial passenger vehicle that includes a longitudinally extending passenger seating area.

In a second aspect the present invention may be said to be a seating unit for a commercial passenger vehicle that has a longitudinally shaped passenger seating zone, the seating unit comprising:

at least two seats that are adjacent to each other to form a row of seats that is to be separated from a like row of seats in front and/or behind in said commercial passenger vehicle, the row to extend perpendicular to the longitudinal direction of said commercial passenger vehicle, and each seat in the row of seats is to face in the forward direction of the vehicle yet each seat is angled away from each other and towards a respective outboard side of the vehicle, and the row of seats is provided as a single unit.

In a further aspect the present invention may be said to be a commercial passenger vehicle that has a longitudinally shaped passenger seating zone, said vehicle comprising:

a seating unit comprises two adjacent seats forming a row of seats, the row extending perpendicular to the longitudinal direction of said commercial passenger vehicle, and each seat facing in the forward direction of the vehicle yet angled away from each other and towards a respective opposite outboard side of the vehicle.

Preferably each seat includes a seat pan portion and a back rest portion that extends upwardly from said seat pan portion.

Preferably the seat pan portions are separated from each other and an armrest is located between the seat pan portions.

Preferably the armrest is a mutual arm rest presented for use by a passenger sedentary in each seat.

Preferably the seating unit includes a utility surface located between the seat pan portions of the seats.

Preferably the utility surface is supported by a base structure in a manner to be movable between a raised position and a lowered position.

Preferably the utility surface when in its raised position is presented for a passenger sedentary in one or each of the respective seats to rest their arm on.

Preferably the utility surface when in its lowered position and together with the seat pan of at least one of said seats form a surface for a passenger to recline on.

Preferably the utility surface when in its lowered position and together with the seat pans of each seat, defines a continuous support surface.

Preferably the utility surface is movably supported between its raised and lowered positions by said base structure, said base structure configured to not prevent a passengers legs from swinging into and out of a region underneath the utility surface when the utility surface is in the raised position.

Preferably a backrest is disposed between the backrest portions of the two seats, presented for use by a passenger sitting on the utility surface when in its lowered position.

Preferably the vehicle further comprises a shell that extends at least in part around the rear of both seats.

Preferably the shell defines at least one foot well to accommodate the feet of a passenger sitting behind the seating unit.

Preferably the foot well is of a shape to allow a passenger sitting behind the seating unit to position their feet below the seat pan of the seat in front.

Preferably the shell extends from the floor of the vehicle above which the seating unit is supported and to a location above the back rest portion.

Preferably the shell is juxtaposed the entire of each back rest portion.

Preferably each seat of the seating unit face at an angle relative to the longitudinal direction of between 15 to 30 degrees and preferably 23 degrees.

Preferably said seats face at an angle relative to each other of between 30 to 60 degrees and preferably 46 degrees.

In still a further aspect the present invention may be said to be a seating arrangement for or in a commercial passenger vehicle that has a longitudinally shaped passenger seating zone, the seating arrangement comprising:

a) two juxtaposed seats, and
b) a shell located to separate the two seats from an identical seating arrangement to be located immediately behind, wherein the two seats are to each face in a forward direction of the vehicle and each face away from each other at and angle (to in use face toward an opposite outboard side of the vehicle to the other), the shell including at least one foot well to receive at least the feet of at least one passenger sitting in the seat of the identical seating arrangement located behind.

Preferably the two juxtaposed seats and the shell define a single seating unit.

Preferably said shell includes a scalloped region to define a foot well into which the feet of a passenger sitting in said identical seating arrangement behind, can position their feet so as to locate at least partially below at least one of the two juxtaposed seats.

Preferably said shell extends upwards from floor level.

In yet a further aspect the present invention may be said to be a seating arrangement for a commercial passenger vehicle that has a longitudinally shaped passenger seating zone, the seating arrangement comprises a pair of seats disposed alongside and secured to each other, each seat comprising:
a backrest portion, and
a seat pan portion;
wherein said seats face in a non-parallel direction that is at an acute angle to each other, and
wherein the backrest portion of each respective seats are nearest the vertex of the acute angle than the seat pan portion, and
wherein a support surface is located between the pair of seats that can be moved between a first condition wherein the support surface offers an arm rest to at least one sedentary passenger and a second condition wherein the support surface is flush with at least one seat pan portion of the pair of seats.

In still a further aspect the present invention may be said to be a seating unit for a commercial passenger vehicle that has a longitudinally shaped passenger seating zone, the seating unit comprises a pair of seats disposed alongside each other, each seat comprising:
a backrest portion and
a seat pan portion;
wherein said seats face in a non-parallel direction that is at an acute angle to each other, and
wherein the backrest portion of each seat is nearest the vertex of the acute angle than the seat pan portion, and
wherein a support member is located between the pair of seats that can be moved between a first condition wherein the support member offers an arm rest to at least one sedentary passenger and a second condition wherein the support member is flush with at least one seat pan portion of the pair of seats.

Preferably two of said support members are provided, a first support member associated with a first of said seats and that can be moved between a first condition wherein the support member offers an arm rest to a passenger sedentary in said first seat and a second condition wherein the support member is flush with the seat pan portion of the first seat, and a second support member associated with a second of said seats and that can be moved between a first condition wherein the support member offers an arm rest to a passenger sedentary in said second seat and a second condition wherein the support member is flush with the seat pan portion of the second seat.

In yet a further aspect the present invention may be said to be a seating unit for a commercial passenger vehicle that has a longitudinally shaped passenger seating zone, the seating unit comprises a pair of seats disposed alongside each other, each seat comprising:
a backrest portion and
a seat pan portion;
wherein said seats face in a non-parallel direction that is at an acute angle to each other, and
wherein the backrest portion of each seat is nearest the vertex of the acute angle than the seat pan portion, and
wherein a support member is located between the pair of seats that can be moved between a first condition wherein the support member offers table to at least one sedentary passenger and a second condition wherein the support member is flush with at least one seat pan portion of the pair of seats.

Preferably two of said support members are provided, a first support member associated with a first of said seats and that can be moved between a first condition wherein the support member offers a table to a passenger sedentary in said first seat and a second condition wherein the support member is flush with the seat pan portion of the first seat, and a second support member associated with a second of said seats and that can be moved between a first condition wherein the support member offers a table to a passenger sedentary in said second seat and a second condition wherein the support member is flush with the seat pan portion of the second seat.

In even a further aspect the present invention may be said to be a commercial passenger aircraft carrying a plurality of identical seat units positioned one behind the other at a floor level in said aircraft, each seat unit providing a passenger accommodation zone to accommodate two sedentary passengers each supported by a respective seat of said unit in a side by side orientation, the two seats oriented at an angle to each other such that the seats face in a non parallel direction and non converging direction, and wherein a fixed shell, extending upward from said floor level, is provided separating said zones in a manner such that the zone nests in-part with a zone of a seat unit in front.

Preferably said seat units are arranged in a column that extends in the fore-aft direction of the aircraft.

Preferably the shell of each said seat unit is fixed relative to a floor of said aircraft.

Preferably said seats of each seat unit can be configured to an upright seating position and a more reclined seating position.

Preferably each said seat includes a seat pan portion and a backrest portion that extends upwardly relative said seat pan portion, both said seat pan portion and said back rest portion moveable relative to said shell to be positioned in an upright seating position and a more reclined seating position.

In yet a further aspect the present invention may be said to be a seating configuration of a commercial passenger vehicle having a longitudinally shaped passenger seating area, said seating configuration comprising:
at least one seating arrangement for accommodating a passenger in a seated position on a seat, said seating arrangement including fasteners to secure said seating arrangement to said passenger vehicle in a manner so that said seat faces at an acute angle to the longitudinal direction of the vehicle and in a direction facing towards an outboard side of the vehicle adjacent to which said seating arrangement is positioned.

Preferably said seating configuration comprises a column of a plurality of seating arrangements, the column extending in a direction parallel to the longitudinal direction, and wherein the seats of all seating arrangements face in a parallel direction to each other.

Preferably the column extends parallel to and on an outboard side of the longitudinal centreline of the vehicle.

Preferably said vehicle is a passenger aircraft and said seating arrangement is disposed adjacent the fuselage wall at a side of the aircraft.

Preferably said seating arrangement comprises a rigid moulded shell covering at least the rear of the seat.

Preferably said shell defines a recess at a rear face of the seating arrangement for a visual display unit to be viewed by a passenger sitting behind the seating arrangement.

Preferably at least one tray table is provided to extend outwardly at the rear of the shell to provide a utility surface for a passenger seated behind the seating arrangement.

Preferably the shell includes at least one armrest presented for use by a passenger sitting in the seat.

Preferably, the armrest is defined on the outboard side of the seat.

Preferably the seating arrangement comprises two adjacent seats.

Preferably the two seats are positioned adjacent each other and aligned each other in a direction perpendicular to the longitudinal direction.

Preferably said seats are angled outward in relation to the longitudinal direction at an angle between 15 to 30 degrees and preferably 23 degrees.

Preferably the shell defines at least one foot well to accommodate the feet of a passenger sitting behind the seat arrangement.

Preferably the seating arrangement comprises two adjacent seats and a fixed shell covering the rear of said two adjacent seats, the shell defining at least a first foot well to accommodate the feet of a passenger sitting behind the seat arrangement and extending at least partially underneath both of the seats.

Preferably the shell defines a second foot well extending at least partially underneath the only one of the seats.

Preferably said seat(s) is moveable between an upright seated position and a more reclined position.

Preferably, at least one of said seats comprises a backrest portion and a seat pan portion.

Preferably, one or more of the backrest portion, seat pan portion is moveable between an upright seated and a reclined more position.

Preferably said seat pan portion includes a front edge and a rearward edge.

Preferably, the seat pan portion raises at its front edge when moving into its reclining position.

In a further aspect the present invention may be said to be a commercial passenger vehicle that includes a longitudinally extending passenger seating area, said vehicle comprising:
  a seating arrangement in said passenger seating area comprising;
    a plurality of seats arranged facing in a parallel direction to each other, each of said seats includes one seat pan, wherein the front edge of each seat pan is staggered from the front edge of the seat pan of the adjacent seat in the facing direction;
    a securing assembly securing the seats to a floor of said vehicle in a manner so that the seats are aligned in a direction substantially perpendicularly to the longitudinal direction and the seats face in an outboard direction and at an acute angle to the longitudinal direction.

Preferably the seating arrangement includes a shell extending at least in part around the rear of the seats.

Preferably, the shell is composed of a rigid moulded plastic or resinous material.

Preferably the shell is configured to accommodate a display unit at the rear of the shell.

Preferably, the shell defines a recess on the rear of the outboard seat arrangement for accommodating a visual display unit.

Preferably, the shell defines recesses on the rear of the outboard seat arrangement, each for accommodating a display unit.

Preferably the display unit includes a viewing screen.

Preferably, the display unit includes a pivoting arm on which the viewing screen may be moved to pivot away from the shell.

Preferably, the shell defines at least one armrest.

Preferably, the armrest is defined on the outboard side of at least one seat of the outboard seat arrangement.

Preferably, the outboard seat arrangement includes at least one tray table foldable outwardly from an arm rest.

Alternately, the outboard seat arrangement includes at least one tray table extending outwardly from the rear of the shell to provide a convenient utility surface for passengers seated behind the outboard seat arrangement.

Preferably each said seat is angled in relation to the longitudinal direction at an angle of between 15 to 30 degrees and preferably 23 degrees.

Preferably, the outboard seat arrangement includes a privacy screen extending between the seats in a outboard seat arrangement.

Preferably, the privacy screen is fixed in position relative to the shell.

Preferably, the privacy screen extends from the shell.

Preferably, the privacy screen is defined by the shell.

Preferably the shell extends upwardly from the floor of the vehicle and defines at least one foot well to accommodate the feet of a passenger sitting behind the seating arrangement.

Preferably the shell defines a first foot well extending at least partially underneath the most outboard seat and a second foot well at least partially underneath the outboard most seat and another of said seats.

Preferably, said seat is moveable between an upright seated and a more reclined position.

Preferably, at least one of said seats comprises a backrest portion and a seat pan portion.

Preferably, one or more of the backrest portion and seat pan portion is moveable between a seated and a reclined position.

Preferably said seat pan portion includes a front edge and a rearward edge.

Preferably, the seat pan portion of said seat drops at its rearward edge when moving to its reclining position.

Preferably, the seat pan portion raises at its front edge when moving into its reclining position.

Preferably the vehicle is an aircraft and the seating arrangement is positioned adjacent the fuselage/cabin wall and the shell is configured to be located adjacent and to be disposed proximate the fuselage/cabin wall.

Preferably said seats are mounted to each other to form a unitary seating arrangement.

Preferably the vehicle is an aircraft and the longitudinal direction is that parallel to the fore/aft direction of the aircraft.

In still a further aspect the present invention may be said to be a seating arrangement for a commercial passenger vehicle having a longitudinally shaped seating area, said seating arrangement comprising;
  a pair of seats mounted alongside each other and facing in a parallel direction;
  a shell extending at least partially around the rear of the seats;
  wherein said shell defines at least one foot well at the rear of the seats to receive the feet of a passenger sitting behind the seating arrangement; and
  wherein the foot well extends at least partially underneath both seats.

Preferably the seats are staggered in alignment with each other in the facing direction.

Preferably the seats are engaged to a securing assembly configured to secure the seats to a floor of a said commercial passenger vehicle in a manner so that the seats are positioned relative each other in alignment with a perpendicular to the fore/aft direction of the vehicle, and wherein the seats face generally in an outboard direction, and at an acute angle to the fore/aft direction of the vehicle.

Preferably each of said seats include one seat pan, wherein the front edge of each seat pan is off set from the front edge of the seat pan of the adjacent seat.

Preferably, the shell is composed of a rigid moulded plastic or resinous.

Preferably the shell is configured to accommodate a visual display unit at the rear of the shell.

Preferably, the shell defines a recess on the rear of the seat arrangement for accommodating a display unit.

Preferably, the shell defines plurality of recesses on the rear of the seat arrangement, each for accommodating a display unit.

Preferably the display unit includes a viewing screen.

Preferably, the display unit includes a pivoting arm on which the viewing screen may be moved to pivot away from the shell.

Preferably, the shell defines at least one armrest.

Preferably, the armrest is defined on the outboard side of at least one seat of the seating arrangement.

Alternately, the seating arrangement includes at least one tray table extending outwardly from the rear of the shell to provide a convenient utility surface for passengers seated behind the seating arrangement.

Preferably said seat(s) is/are angled outward in relation to the longitudinal axis at an angle of between 15 to 30 degrees.

Preferably said seat(s) is/are angled at 25 degrees to the longitudinal axis.

Preferably, the seating arrangement includes a privacy screen extending between the seats in a seating arrangement.

Preferably, the privacy screen extends from and is defined by the shell in a permanent fashion.

Alternately, the privacy screen is removable from the shell.

Preferably, the privacy screen is fixed in position relative to the shell.

Preferably, the privacy screen extends from the shell.

Preferably, the privacy screen is defined by the shell.

Preferably, the shell further includes a foot well extending at least partially underneath the most outboard seat, wherein said foot well is open to the outboard side of the seating arrangement.

Preferably, each said seat is moveable between a seated and a reclined position.

Preferably, each said seats comprises a backrest portion and a seat pan portion.

Preferably, at least one of said seats includes a footrest portion.

Preferably, one or more of the backrest portion and seat pan portion is moveable between a seated and a more reclined position.

Preferably said seat pan portion includes a front edge and a rearward edge.

Preferably, the seat pan portion of said seat drops at its rearward edge when moving to its reclining position.

Preferably, the seat pan portion raises at its front edge when moving into its reclining position.

Preferably, the shell is configured to be located adjacent and to be disposed proximate the contour of the side wall of the cabin of the vehicle when the seating arrangement is installed in a commercial passenger vehicle.

Preferably said seats are mounted to each other and form a unitary seating pair.

In still a further aspect the present invention may be said to be a commercial aircraft passenger seating configuration defined within at least part of a section of the aircraft comprising:

a plurality seating arrangements, each seating arrangement comprising of two juxtaposed seats to define a row of seats and a shell extending about at least part of the two seats to at least separate the two seats from a said seating arrangement located behind, said shell also defining at least one arm rest for each of the seats in the seating arrangement.

Preferably each seat can move relative to said shell between an upright seating position and a more reclined seating position.

Preferably each seat has it facing direction at an angle to the longitudinal direction of the aircraft.

Preferably the facing direction is in a direction away from the longitudinal centreline of the aircraft.

Preferably the seating arrangement is located immediately adjacent the outboard shell of the aircraft.

Preferably each seat in a said arrangement is located no more advanced in the aircraft as the other seat in the arrangement.

Preferably the shell defines two foot wells, each to accommodate the feet of a passenger in a seat of a seating arrangement behind, the first foot well at least in part located below both seats to receive the feet of a passenger behind that is positioned inboard more, and a second foot well that is located at least in part below the outboard most seat to receive the feet of a passenger behind that is outboard more.

In yet a further aspect the present invention may be said to be a commercial aircraft passenger seating configuration defined within at least part of a section of the aircraft comprising:

a plurality of rows of seating arrangements, each seating arrangement comprising of two juxtaposed seats and a shell extend extending about at least part of the seats to at least separate the two seats from a similar seating arrangement located behind wherein the two seats each face in opposite outboard directions and away from each other.

Preferably each seating arrangement is located mid-ships of the aircraft.

Preferably the plurality of rows are arranged in a column, the column extending in a direction parallel to the longitudinal direction of the aircraft.

Preferably the seats of a seating arrangement are closer together at their backrests that at their seat pans.

Preferably each seat faces in a direction that is at an angle to the longitudinal direction of the aircraft and is between 5 and 30 degrees to the longitudinal direction.

Preferably said shell also defines at least one arm rest for each of the seats in the seating arrangement.

Preferably each seat can move relative to said shell between an upright seating position and a more reclined seating position.

Preferably each seat a said arrangement is located no more advanced in the aircraft as the other seat in the arrangement.

Preferably each seat includes a seat pan and a utility surface is located intermediate of the seat pans of each seat in a seating arrangement.

Preferably the utility surface is made up of two sections.

Preferably the utility surface can be moved to be raised and lowered including being moved to be coplanar the seat pans of each seat and to be moved to be provide an arm rest or table for the passenger(s) in one or both seats.

Preferably a storage area is provided below the utility surface that can receive and store a passenger's personal belongings.

Preferably the storage area is enclosable.

Preferably the utility surface is supported by a support structure that facilitates its movement.

Preferably the support structure supports the support surface in a manner to allow a gap to be defined between the seat pan and the support structure when the utility surface is in the raised condition.

Preferably the support structure is generally "L" shaped.

Preferably the "L" shape facilitates the provision of a clear space between said two adjacent seats, at seat pan level when the support structure is in the up position.

Preferably utility surface can at least in part move relative to the support structure to expose and close a storage tray located beneath the support structure.

Preferably there is a privacy screen located intermediate of the seats and located to be at head level of an adult passenger sitting a seat.

Preferably the shell extends at least in part between the two seats to define a privacy screen between the two seats.

Preferably the shell defines at least part of a foot well to accommodate the feet of a passenger in a respective seat of a seating arrangement behind.

Preferably the foot well extends at least in part beneath a corresponding seat of said seating arrangement.

Preferably the foot well is fully enclosed other than at where the feet of a passenger are received into the foot well.

Preferably the shell is a moulded member.

Preferably, the central seating arrangement includes controls for in flight entertainment and the like.

Preferably each seating arrangement is located mid-ships of the aircraft.

In still a further aspect the present invention may be said to be a commercial aircraft with a passenger seating configuration defined within at least part of a section of the aircraft comprising:
- a plurality of rows of a seating arrangement, each seating arrangement comprising of two juxtaposed seats wherein the two seats each face in opposite outboard directions.

In still a further aspect the present invention may be said to be a commercial passenger aircraft that includes a plurality of zones to accommodate two passengers in a sedentary position each zone defined between and in part by a plurality of rows of a seating unit, each seating unit comprising of two juxtaposed seats on each of which a passenger can sit wherein the two seats each face in opposite outboard directions and wherein each zone nests in-part with an adjacent zone.

Preferably each seating unit includes a fixed shell that is located between said zones and extends upwards from the floor of the aircraft to above the seats.

Preferably each seat of said seating unit faces away from each other at an acute angle and face at an acute angle to the longitudinal direction of said aircraft.

In still a further aspect the present invention may be said to be a seating unit for a commercial passenger vehicle that has a longitudinally shaped passenger seating zone, the seating unit comprises:
a. two seats, each comprising a seat pan and a seat back, the two seats positioned adjacent to each other to form a row of seats, a first of the seats to be located adjacent an outboard side of the vehicle, and each seat in the row is to face in the forward direction of the vehicle yet at least the second of the seats is angled towards the outboard side of the vehicle adjacent to which the row will be placed, and
b. a shell located behind the two seats and the shell defining a foot well for a passenger in the second seat of an identical row behind the row of seats, the foot well located in part beneath the seat pans of both seats in the row, and
c. the row of seats and shell are a single unit.

In still a further aspect the present invention may be said to be a seating system for installation in a commercial passenger vehicle having a longitudinally shaped seating area, said system comprising
- at least one seating arrangement as herein above described to be located on the centre line of the vehicle; and
- at least one seating arrangement as herein above described to be located adjacent and outboard more of the first mentioned seating arrangement.

In still a further aspect the present invention may be said to be a seating unit for a commercial passenger vehicle that has a longitudinally shaped passenger seating zone, the seating unit comprises:
- at least two seats that are adjacent to each other to form a row of seats, the row is to extend perpendicular to the longitudinal direction, and each seat in the row is to face in the forward direction of the vehicle yet is angled towards the outboard side of the vehicle adjacent to which the row will be placed, wherein the row of seats are provided as a single unit.

In still a further aspect the present invention may be said to be a commercial passenger vehicle that has a longitudinally shaped passenger seating zone, the vehicle including a seating unit that comprises:
- at least two seats that are adjacent to each other forming a row of seats, the row extending perpendicular to the longitudinal direction, and each seat in the row faces in the forward direction of the vehicle yet is angled towards the outboard side of the vehicle adjacent to which the row is placed.

In still a further aspect the present invention may be said to be a section of an aircraft, passenger seats on one side of the centre line of the aircraft that face towards one side of the aircraft and seats on the other side of the centre line of the aircraft that face towards the opposite side of the aircraft.

Preferably said passenger seats on said one side are arranged is rows of two seats, the row direction being perpendicular to the fore/aft direction of the aircraft and said passenger seats on said other side are arranged is rows of two seats, the row direction being perpendicular to the fore/aft direction of the aircraft.

Preferably seats on said one side face toward the side of the aircraft to which they are adjacent to and seats on said other side face towards the side of the aircraft to which they are adjacent to.

In still a further aspect the present invention may be said to be an aircraft that includes in a cabin section, seats on one side of the centre line of the aircraft that face at an acute angle or angles to the centreline of the aircraft and away from the centre line and seats on the other side of the centre line of the aircraft that face at an acute angle or angles to the centre line and also away from the centreline.

Preferably all seats on one side of the centreline face in away from the centreline and all seats on the other side face away from the centreline.

Preferably the seats face at an angle of between 10 and 30 degrees to the centreline direction.

Preferably the seats on one side are arranged in a row and the seats on the other side are arranged in a row.

Preferably the row direction is perpendicular to the centreline direction of the aircraft.

Preferably there are a plurality of rows of seats and wherein there are at least two seats of each row on each side of the centreline that face a respective side of the aircraft.

Preferably there is an aisle between the centre line and the seats on each side.

Preferably on each side of the centreline of said aircraft there are two said seats on the window side of the aisle and there is one other seat positioned on the centreline side of the aisle.

Preferably there is a centre seat unit through which the centreline passes said centre seat unit includes two seats.

Preferably the centre seat unit is as described above.

Preferably an outboard seat unit that includes two seats, the outboard seat unit as herein above described.

Preferably only the outboard seats units are located in the section of the aircraft.

Preferably the aisle is aligned with and located along the centre line of the aircraft and separated the seats on each side of the centreline.

In still a further aspect the present invention may be said to be a 2-2-2 row seat layout in a cabin of a passenger aircraft where in each row 3 seats face towards one side and 3 seats face towards the opposite side of the aircraft.

Preferably the facing directions of each set of 3 seats is parallel to each other.

Preferably the row direction is perpendicular to the longitudinal direction of the aircraft.

Preferably all the seats in a row are aligned in a direction perpendicular to the fore/aft direction of the aircraft.

Preferably both outboard pair of seats in the row are aligned in a direction perpendicular to the fore/aft direction of the aircraft and the inboard pair are staggered fore or aft of the perpendicular of the outboard pair of seats.

Preferably an aisle is provided between each pair of adjacent seats.

In still a further aspect the present invention may be said to be a 2-2 row seat layout in a cabin of a passenger aircraft wherein 2 seats in each row face towards one side and 2 seats in each row face towards the opposite side of the aircraft.

Preferably the facing direction of each set of 2 adjacent seats is parallel to each other.

Preferably the row direction is perpendicular to the longitudinal direction of the aircraft.

Preferably an aisle is exists between each pair of adjacent seats.

In still a further aspect the present invention may be said to be a seating unit for an aircraft, the seating unit comprises a pair of seats disposed alongside each other and each seat comprising a backrest portion and a seat pan portion each seat mounted to a plinth that includes fasteners to fasten the seat unit to seat rails of an aircraft so that said seats faces at an acute angle to the fore/aft direction of the aircraft yet no one of the seats is advance more in the aircraft than the other seat of the seat unit.

In still a further aspect the present invention may be said to be a commercial passenger aircraft carrying a plurality of identical seat units positioned one behind the other at a floor level in said aircraft, each seat unit providing a passenger accommodation zone to accommodate two sedentary passengers each supported by a respective seat of said unit in a side by side orientation, the two seats oriented at an angle to the fore/aft direction of the aircraft, and wherein a fixed shell, extending upward from said floor level, is provided separating said zones in a manner such that the zone nests in-part with a zone of a seat unit in front.

Preferably said seat units are arranged in a column that extends in the fore-aft direction of the aircraft.

Preferably the shell of each said seat unit is fixed relative to a floor of said aircraft.

Preferably said seats of each seat unit can be configured to an upright seating position and a more reclined seating position.

Preferably each said seat includes a seat pan portion and a backrest portion that extends upwardly relative said seat pan portion, both said seat pan portion and said back rest portion moveable relative to said shell to be positioned in an upright seating position and a more reclined seating position.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

For the purpose of this specification, the term "facing" when used in relation to the direction that a seat is facing relates to the direction in which a passenger when seated in the seat in a normal manner will be facing when normally supported by a seat and when viewed in plan view, and any reference to "face" or "faces" is to be construed accordingly.

For the purposes of this specification, the term "outboard" when used in relation to a facing direction of a seat, relates to a direction that is towards a side of the vehicle and that is at an angle to the fore/aft direction of the vehicle (but is not restricted to being perpendicular to the fore/aft direction).

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE PREFERRED EMBODIMENT(S))

Figure 1:
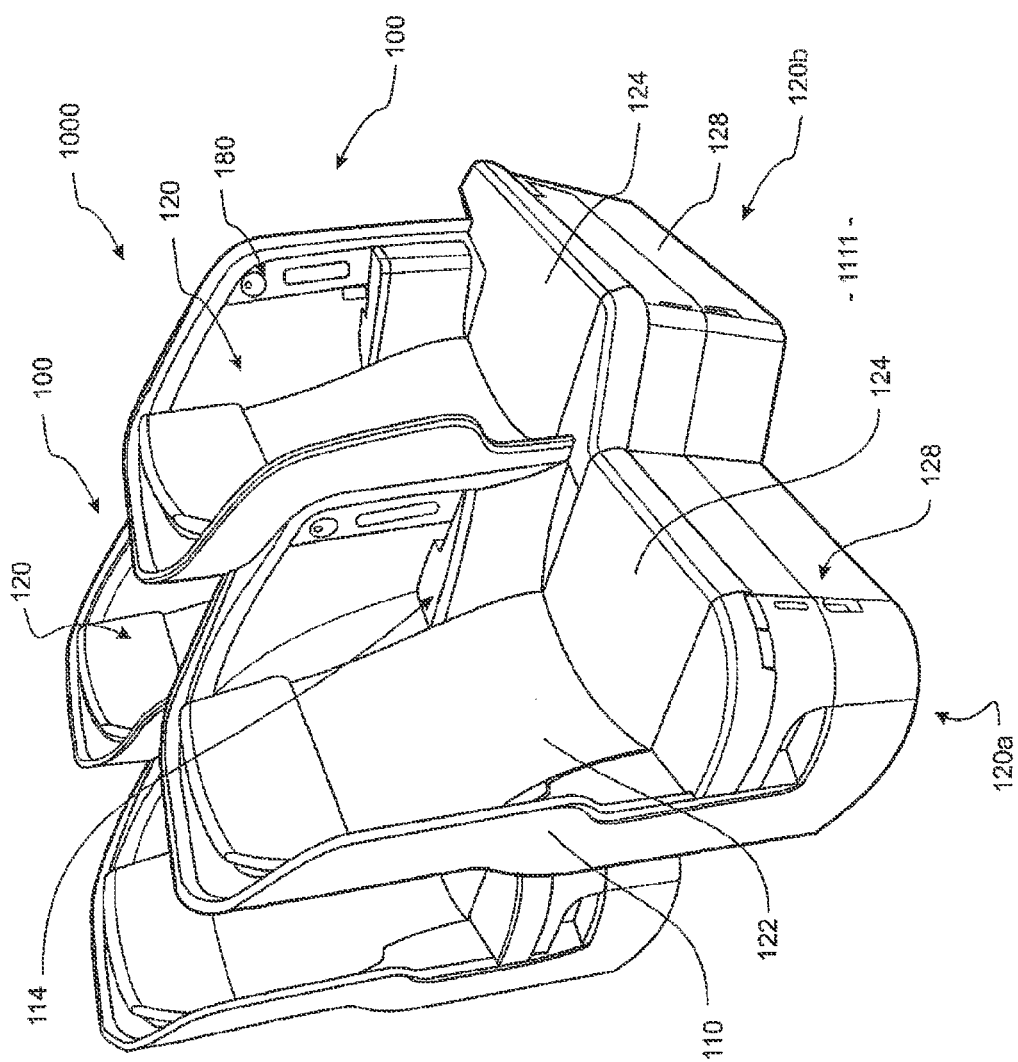
FIG. 1 is a front perspective view of two outboard seat units.
Figure 2:
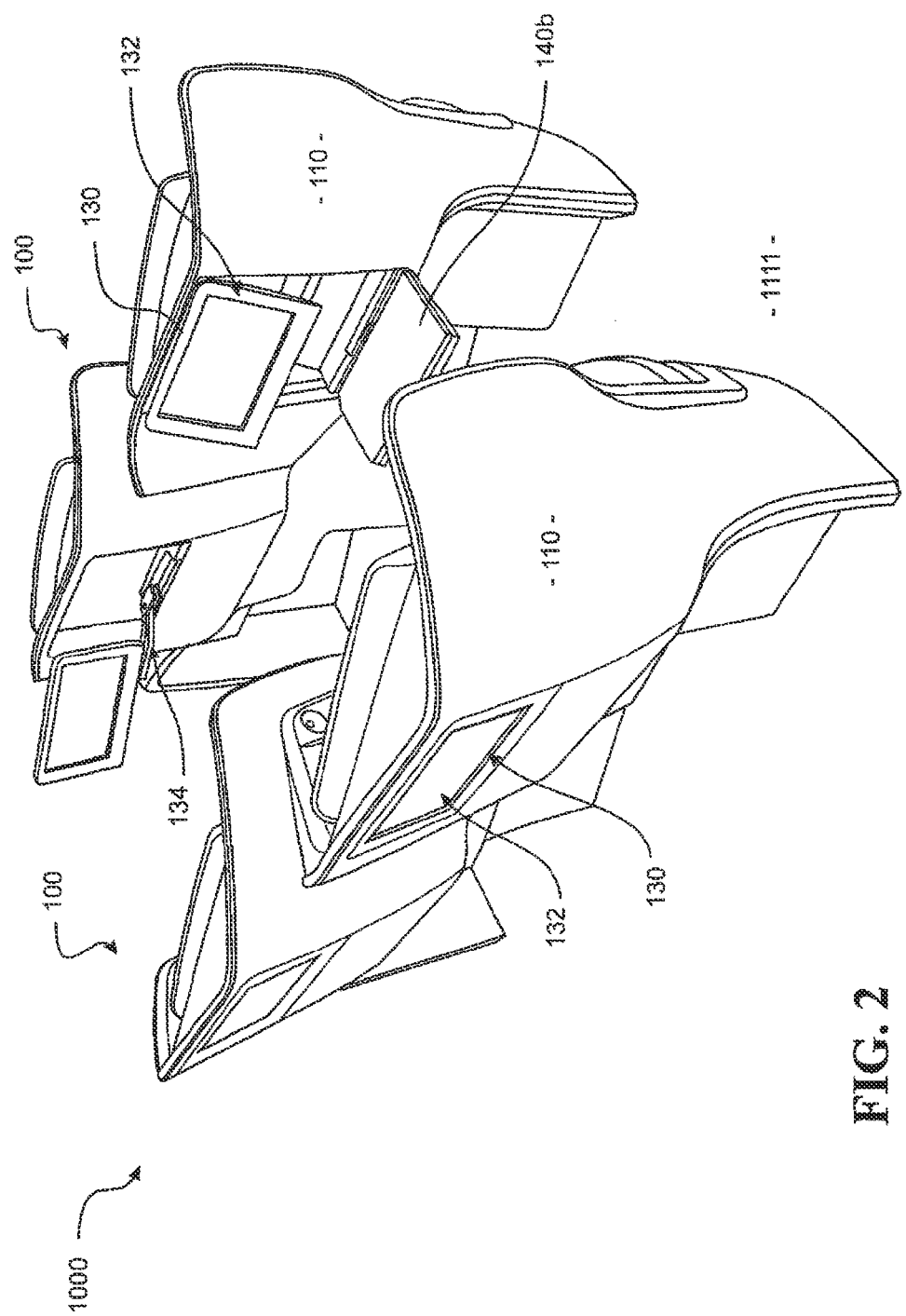
FIG. 2 is a rear perspective view of two outboard seat units.

FIGS. 1-2, 7a-7e show an example of outboard seat unit 100 in or for a commercial passenger vehicle having a longitudinally shaped seating area. The vehicle may be a train, boat, aircraft, or bus. It is preferably an aircraft and the seating area is a passenger accommodation zone such as in a cabin or cabin section of the aircraft. The unit is herein described as being outboard because it is preferably positioned adjacent an outboard side of the vehicle. Eg a side that extends parallel to the fore/aft direction (such as the normal travel direction) of the vehicle.

The outboard sea unit 100 includes two seats 120. When installed on a vehicle, one of the seats may be in an inboard more position such as seat 120a and the other an outboard more position such as seat 120b. The seats 120a and 120b preferably face in a parallel direction to each other. The seats 120a and 120b are not disposed directly side by side each other but are instead staggered in lateral alignment from each other by a distance B so that the two adjacent passengers do not side shoulder to should next to each other. The outboard seat 120b is positioned further forward more than the inboard seat 120a seat in the direction in which these seats face, yet are aligned in a direction lateral to the fore-aft direction.

The outboard seat unit includes two seats each including a seat pan and back rest. The unit also includes a rigid moulded plastic shell 110 extending from one side of the seats 120, around the rear side of the seats 120 to an opposed side of the seats. The shell at least partially surrounds the rear of the seats. The shell extends upwardly from the floor and is fixed relative thereto.

The shell 100 may define armrests 114 for each of the seats 120.

A privacy screen 150 may be defined between the seats 120 to provide privacy between passengers seated in the seats 120. It is envisaged that in a preferred embodiment the privacy screen 150 will extend from and be defined by the shell 110 in a permanent fashion, although it could also be removable or movable in another embodiment.

The outboard seat unit 100 may include a plurality of display unit 130 which are each accommodated into a recess 112 in the rear side of the shell 110.

The display unit 130 comprises a viewing screen 132 for displaying media such as movies, games, videos, DVD's CD's, other in flight entertainment, flight information and the like. The viewing screen 132 is mounted on a pivoting arm 134 by which the viewing screen 132 may be moved away from the shell 110 to provide for convenient viewing of the viewing screen 132 by passengers seated behind.

The outboard seat unit 100 may include controls 180 such as for in flight entertainment and lights.

The outboard seat unit 100 further comprises two tray tables 140. It is envisaged that in one embodiment, the tray table 140a can be foldable from a storage compartment (not shown) under the armrest 114 associated with each seat 120. However, in another embodiment, the tray tables 140b may be configured to extend from the rear of the outboard seat unit 100, and in particular from the rear of the shell 110, to provide a convenient utility surface for passengers seated behind.

Figure 7A:
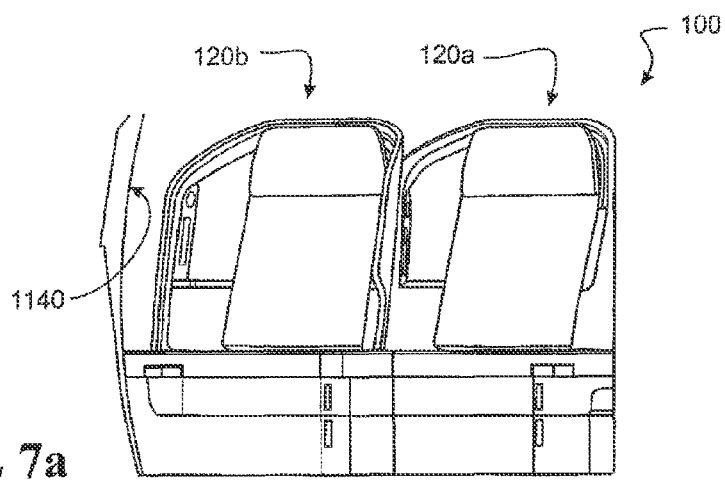
FIG. 7a is a front view of an outboard seat unit.
Figure 7B:
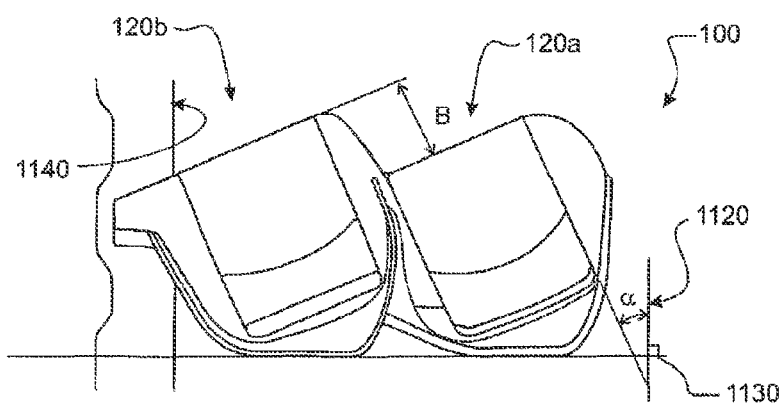
FIG. 7b is a plan view of an outboard seat unit.
Figure 7C:
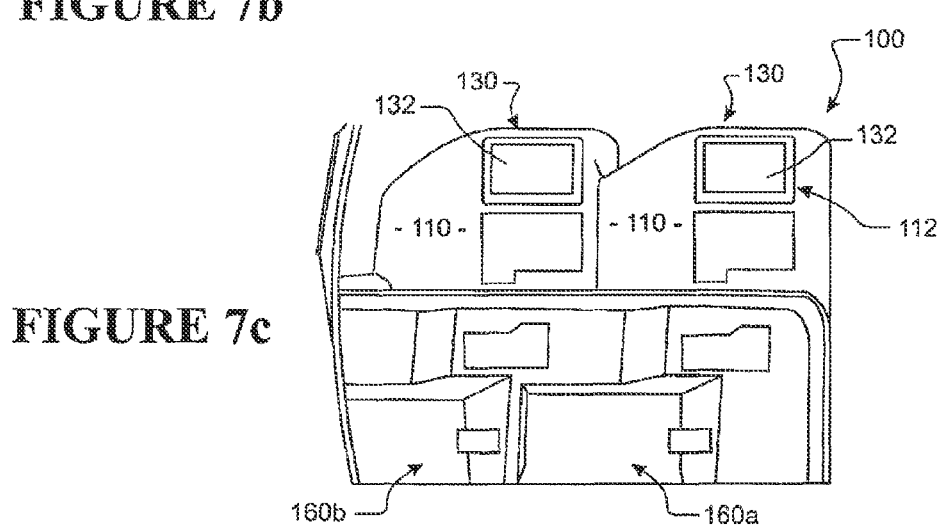
FIG. 7c is a rear view of an outboard seat unit.
Figure 7D:
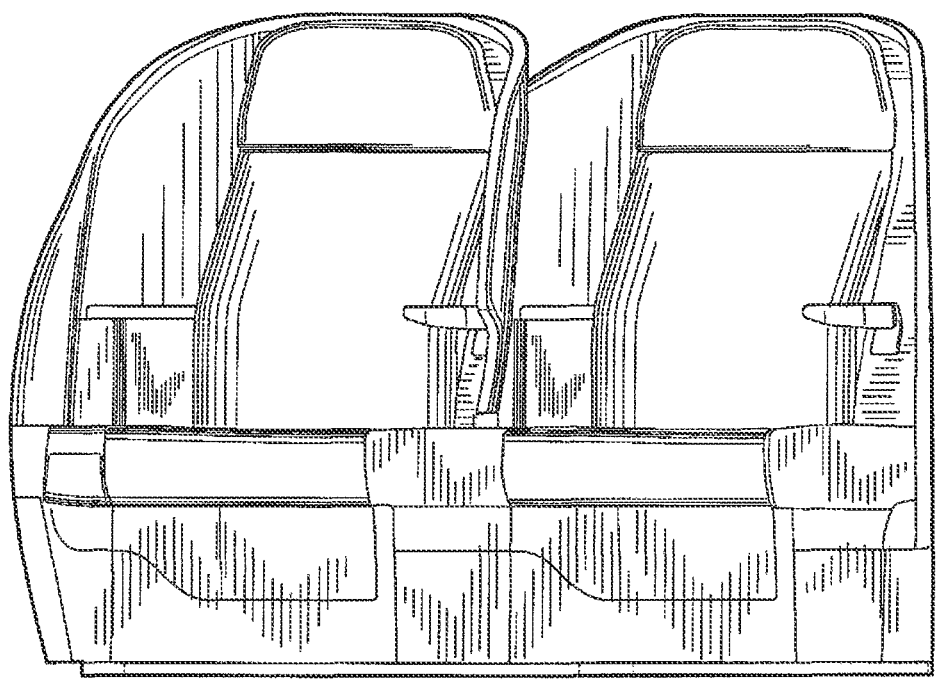
FIG. 7d is a front view of an outboard seat unit.
Figure 7E:
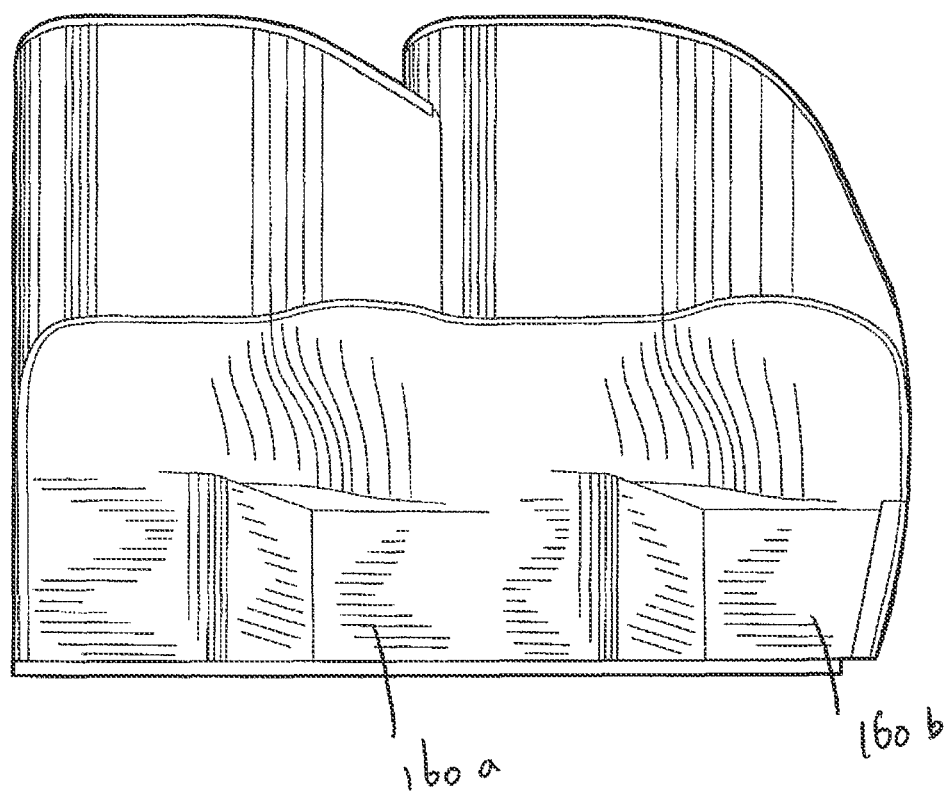
FIG. 7e is a plan view of an outboard seat unit.
Figure 8:
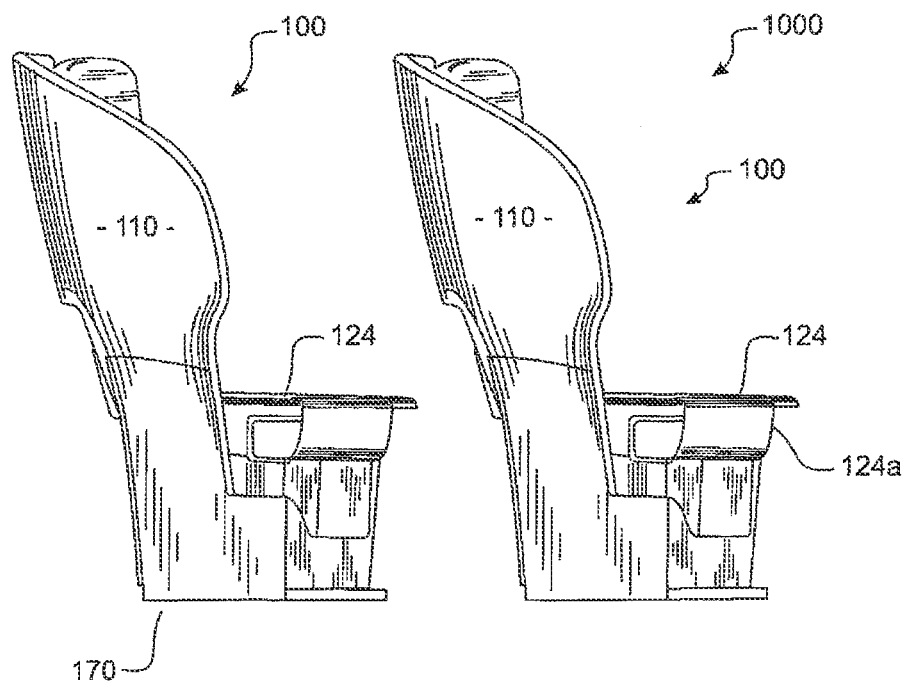
FIG. 8 is a side view of an outboard seat unit.
Figure 9:
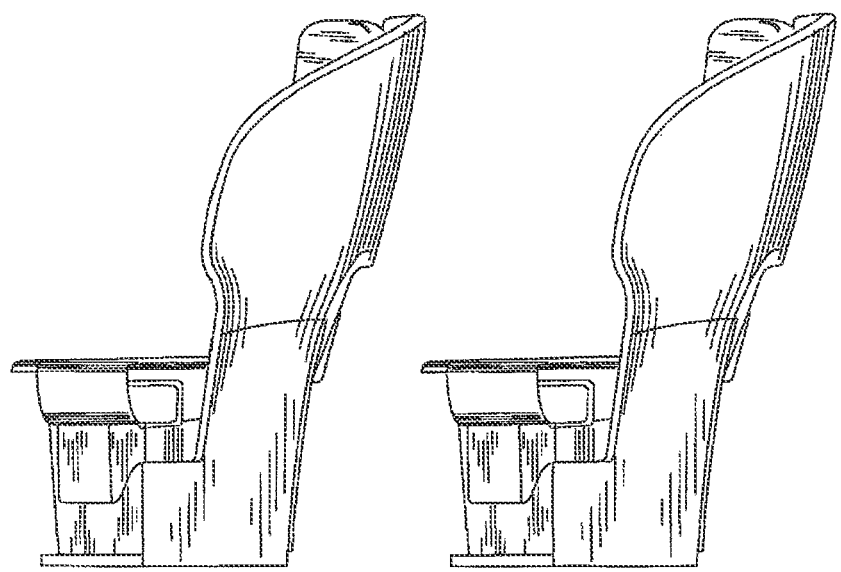
FIG. 9 is a side view of an outboard seat unit on the opposite side of the aircraft, (e.g. a mirror image of FIG. 8, FIG. 10 shows a perspective view of the inboard seat unit, FIG. 11 shows a side view of FIG. 10, FIG. 12 shows a front view of the middle section of the seat unit of FIG. 10, FIG. 13 is a front top perspective view of an inboard seat unit, FIG. 13a shows the seat of FIG. 13 where passengers are sedentary in each seat, FIG. 13b shows the seat of FIG. 13 where passengers are sedentary in each seat, FIG. 14 is a top view of an inboard seat unit, FIG. 15 is a rear top perspective view of an inboard seat unit, FIG. 16 is a rear view of an inboard seat unit, FIG. 17 is a side view of an inboard seat unit, FIG. 18 is a front perspective view of an inboard seat unit, FIG. 19 is a front view of a wide body aircraft such as a Boeing 777, FIG. 20 is a plan view of FIG. 19, FIG. 21 is a side view of FIG. 20, FIG. 22 is a view at section cc of FIGS. 21 and 19 showing how a section of the aircraft may include a seat lay out that comprises of two outboard seat units having two seats and one inboard seat unit having two seats and two aisles at region B, FIG. 23 is a view in direction AA of FIG. 22, FIG. 24 is a close up plan view of region B of FIG. 22, FIG. 25 is a front view of a narrow body aircraft such as a Boeing 737, FIG. 26 is a plan view of FIG. 25, FIG. 27 is a side view of FIG. 25, FIG. 28 is a view at section cc of FIGS. 25 and 26 showing how a section of the aircraft may include a seat lay out that comprises of two outboard seat units having two seats and one inboard seat unit having two seats and two aisles at region B, FIG. 29 is a close up plan view of region B of FIG. 27, and FIG. 30 is a view in direction AA of FIG. 27, FIG. 31 show a plan view of the outboard seats arranged in a column and wherein foot wells as shown to extend under the seat pans in front.

The outboard seat unit may further comprise a securing assembly 170 configured to secure at least the seats 120 to a floor 1111 of a commercial passenger vehicle. The securing assembly 170 is configured to secure the seats 120 seats to a floor 1111 or seat rails at floor level in a manner so that the seats 120 are aligned in a direction substantially perpendicularly to the longitudinal axis 1120 of the vehicle. In this way no one of the two seats 120 are preferably advance more in the vehicle than the other. The seats 120 face generally in an outboard direction, and at an acute angle α to the longitudinal axis 1120 of the vehicle (as shown in FIG. 7b). Preferably this acute angle α is between 15 to 30 degrees, and more preferably at about 23 degrees to the longitudinal axis.

In a preferred embodiment, due to the offset of the seats by distance B, corresponding features of each seat 120 in the outboard seat unit 100 will be aligned with each other on a line substantially perpendicularly to said longitudinal axis 1120. In this way, while the passengers seated in the outboard seat unit have more leg room to stretch, the pitch between seat units can be limited to resemble that of a standard (side-by-side) seating configuration.

In a preferred embodiment, the outboard seat unit 100 can be disposed to an outboard side of the longitudinal centre line of the vehicle, to be located in a position so that the outboard seat unit 100 is disposed adjacent an inside cabin wall 1140 on the side of the vehicle. Where the vehicle is an aircraft, the wall is that adjacent the fuselage. It is envisaged that the shell 110 will be configured to lie adjacent or proximate to and follow the contour of the side wall 1140, in order to present an aesthetically pleasing outboard seat arrangement, and to make use of the space between the outboard most seat 120b and the cabin wall 1140.

Figure 31:
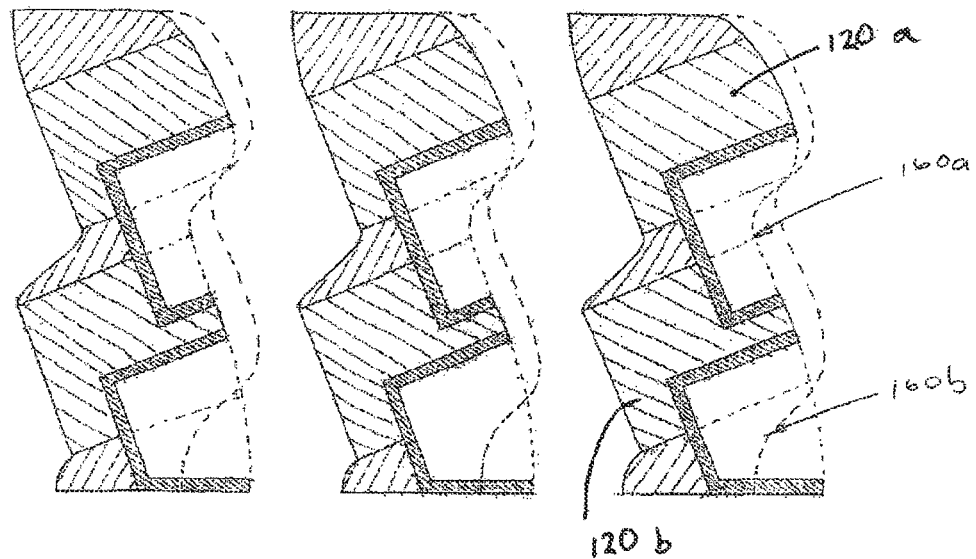

In one embodiment, as shown in FIG. 31, the shell defines at a pair of foot wells 160, notably an inboard foot well 160a and an outboard foot well 160b, which extend at least partially underneath one or more of the seats 120. In a preferred embodiment, the inboard foot well 160a extends at least partially underneath both of the seats 120-a&b so that a passenger accommodated in an inboard seat 120a of a similar outboard seat arrangement 100 disposed behind the outboard seat arrangement 100 will be able to extend their legs forward in alignment with the seat 120 (i.e. at the same acute angle α that the seat 120 is aligned at).

In the same way, a passenger seated in an outboard seat 120b of a similar outboard seat arrangement 100 disposed behind the outboard seat arrangement 100 will be able to extend their legs forward in alignment with the seat 120 into the outboard foot well 160b. It is envisaged that the outboard foot well 160b will have an open side on the outboard side of the outboard seat arrangement 100 (as shown in FIG. 31), in order to allow for increased leg room.

It is envisaged that each seat 120 will be moveable between a seated upright and a reclined position. Each seat comprises a backrest portion 122 and a seat pan portion 124. The seat pan portion of the seat 120 defines a front edge 124a and a rearward edge 124b. Each of the backrest portion 122, seat pan portion 124 and footrest portion 128 is moveable between a seated upright and a reclined more position. The seat pan portion 124 of the seat 120 may drop downwardly at its rearward edge 124b when moving to its reclining position, while the front edge 124a of the seat pan portion 124 may raise upwardly. The shell stays stationary whilst the seat pan and or back rest move.

The arm rest, preferably defined by the shell also stay stationary. The arm rest 114 of the outboard most seat of the seat unit is no more forward in the vehicle than the corresponding arm rest of the board more seat of the seat unit.

Figure 24:
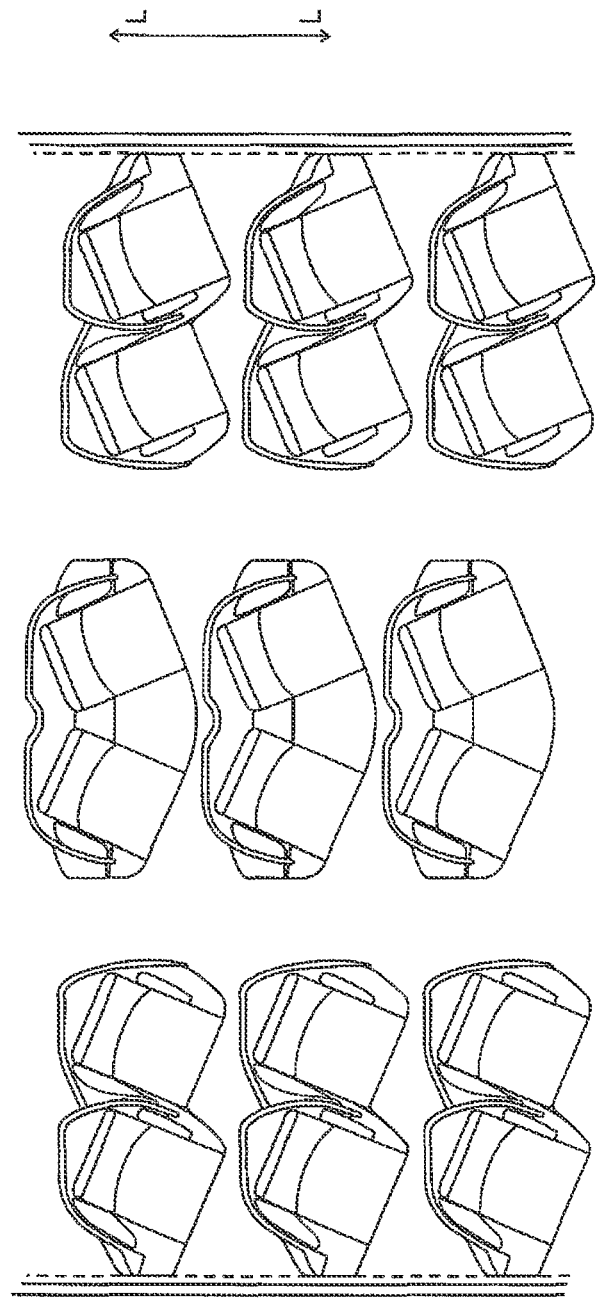
Figure 25:
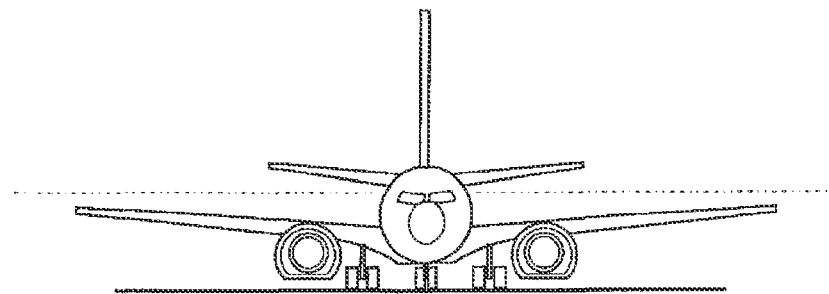
Figure 26:
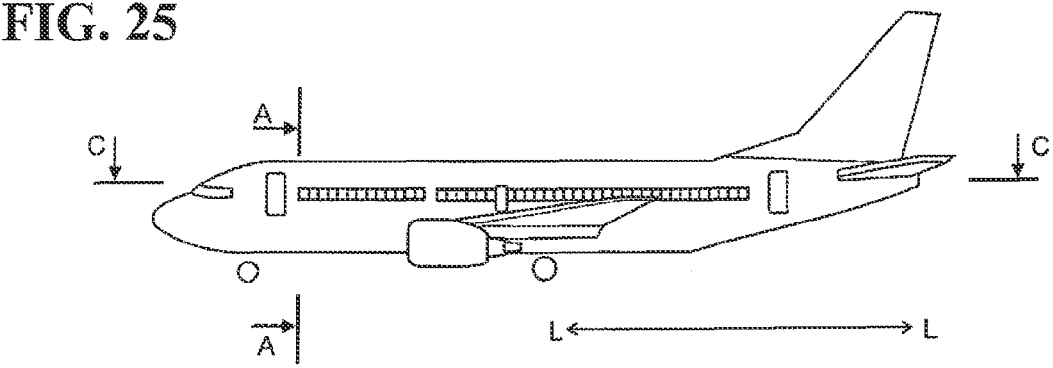
Figure 27:
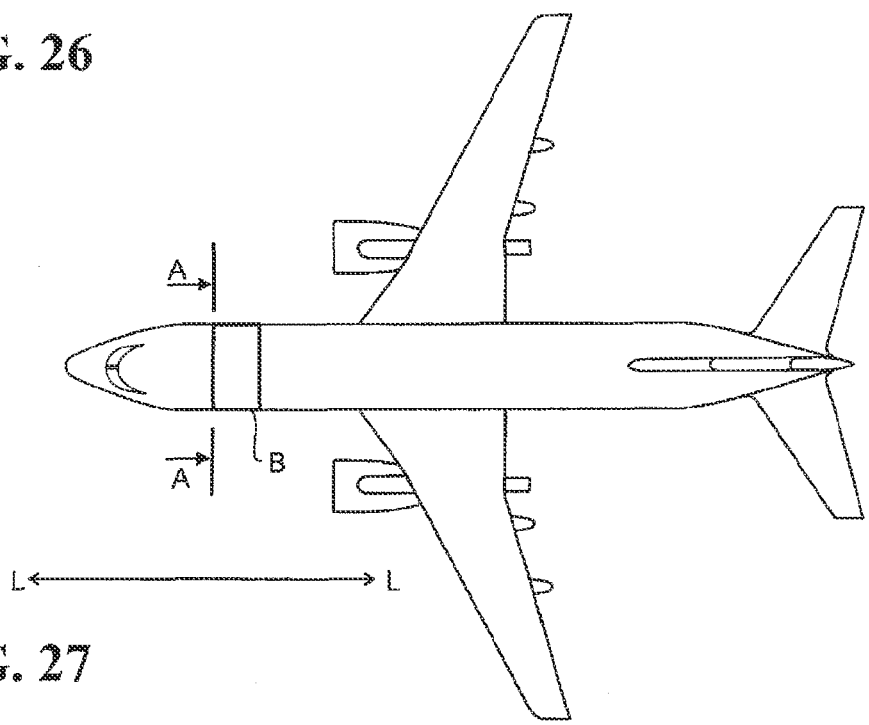
Figure 29:
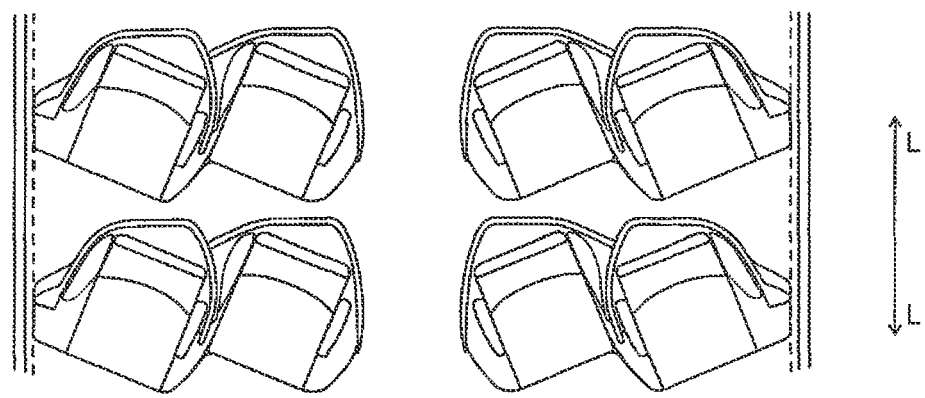

As shown in FIGS. 24 and 29, the outboard seat units 100 described above are configurable into an outboard seating configuration 1000 for a commercial passenger vehicle having a longitudinally shaped seating area parallel to direction LL. The outboard seating configuration 1000 comprises a plurality of outboard seat units 100 as described above, with each outboard seat unit 100 comprising a pair of seats 120, and wherein one outboard seat arrangement 100 is disposed behind the other.

Each outboard seat unit 100 in the seating configuration 1000 is secured to the floor 1111 of the passenger vehicle to be aligned behind one another. Each outboard seat unit 100 is secured at the floor 1111 to so that the seats 120 of the outboard seat arrangement 100 face in a direction generally in an outboard direction, and at an acute angle α to the longitudinal axis 1120 of the vehicle.

Each of the outboard seat units 100 is located to an outboards side of the central longitudinal axis 1120, preferably to be located immediately adjacent an inside cabin side wall 1140 of the vehicle.

In this preferred outboard seating configuration 1000, the general alignment of the seats 120a and 120b in the forward more outboard seat unit of a pair of seat units will be parallel with the general alignment of the seats 120 in the rear more outboard seat unit 100.

According to another aspect of the invention, and as described with reference to FIGS. 3, 4, 6, and 9, there is provided an inboard seat unit 200. It may be located at a longitudinal centre line 1120 of a commercial passenger vehicle.

The inboard seat unit 200 comprises a pair of seats 220 disposed alongside and secured to each other. Each seat comprises a backrest portion 222, a seat pan portion 224 which operate similarly to similar features of the seats 120 described for the outboard seat unit 100.

The seats 220 of the inboard seat unit 200 are aligned at an acute angle β to the longitudinal axis 1120 of the vehicle, and at an acute angle 2×β to each other. The backrest portions 222 of the respective seats 220 are located nearest the vertex V of the acute angle 2×β than the seat pan portion 224. In this way passengers seated in juxtaposed adjacent seats 220 on the inboard seat unit 200 are facing away from each other in opposite outboard directions for increased privacy. In a preferred embodiment, the angle β is in the range of 15 to 30 degrees and more preferably 23 degrees.

The inboard seat unit 200 further includes a utility surface 216 extending between the seat pan portions 224 of the respective seats 220. It is envisaged that the utility surface 216 is made up of two sections, and can be moved to be raised and lowered (preferably each section individually and/or jointly) including being moved to be coplanar the seat pan portions 224 of each seat and to be moved to a position to provide an arm rest or table for the passenger(s) in one or both seats 220. When in the lowered position it can act as a seat for a third person or to create a larger surface together with the adjacent seats pans, for one or both primary passengers to use.

Figure 10:
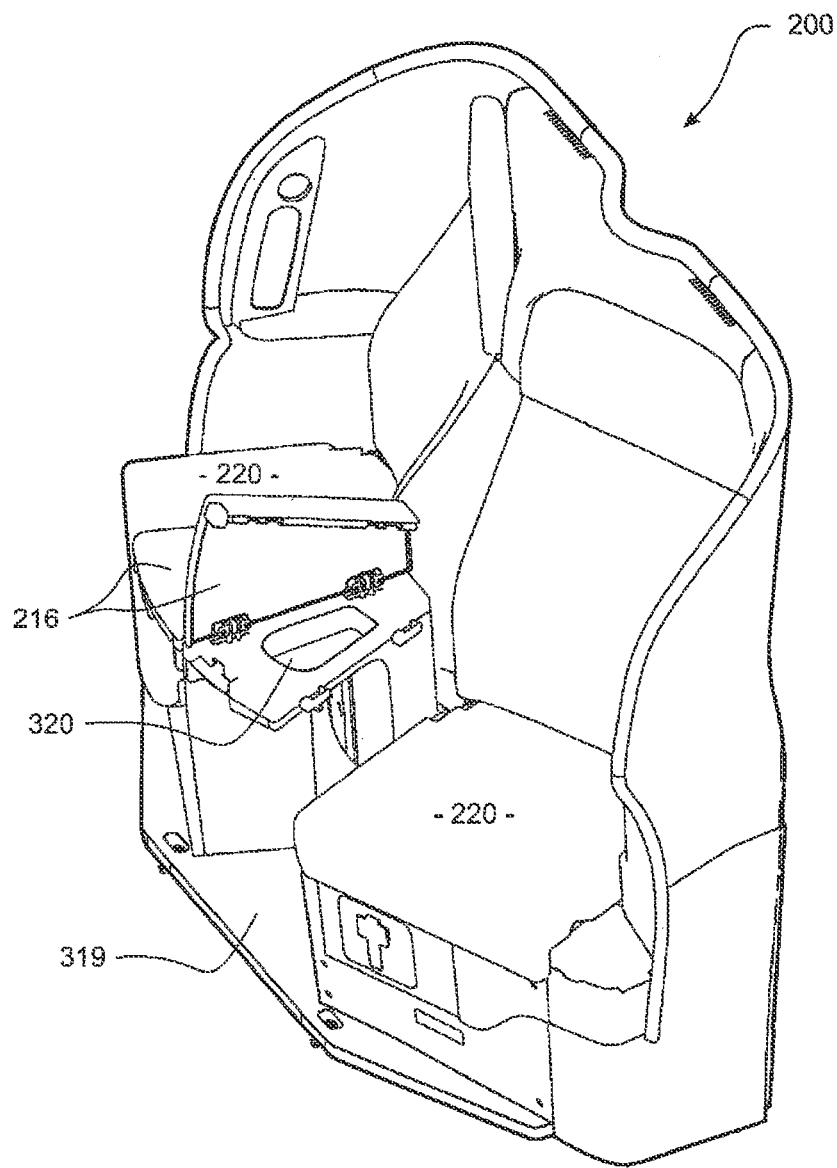

In one embodiment, below the utility surface 216 is a void that may define a storage area 319 that can receive and store a passenger's personal belongings. This can be seen in FIG. 10 The storage area may be closed and be openable in a direction facing towards the front of the vehicle or aircraft, and extends from the floor 1111 upwards. The utility surface may function as a seat when in the down position to let a person sit thereon and intermediate of the primary seats and as an armrest or table when in an elevated position. The utility surface may also act a lid to a storage compartment 230 there under. The utility surface may be provided as two sections as shown in FIG. 10 so that each passenger can separately open and close a storage compartment 320. The utility surface when in the elevated position can also act as a table top for people in the two seats to use/share. This can facilitate shared dining onboard the aircraft. The passengers' legs can locate in the area under the surface.

The utility surface is supported by a base structure 331 that can let the surface move between an elevated and lowered position. Preferably the base structure 331 is supported by way of a rail mechanism relative to the seat structure to allow it to move up and down. A locking mechanism may be used to lock the base structure at a certain or desired height(s). Preferably this height may be infinitely variable or may be at set positions.

Figure 11:
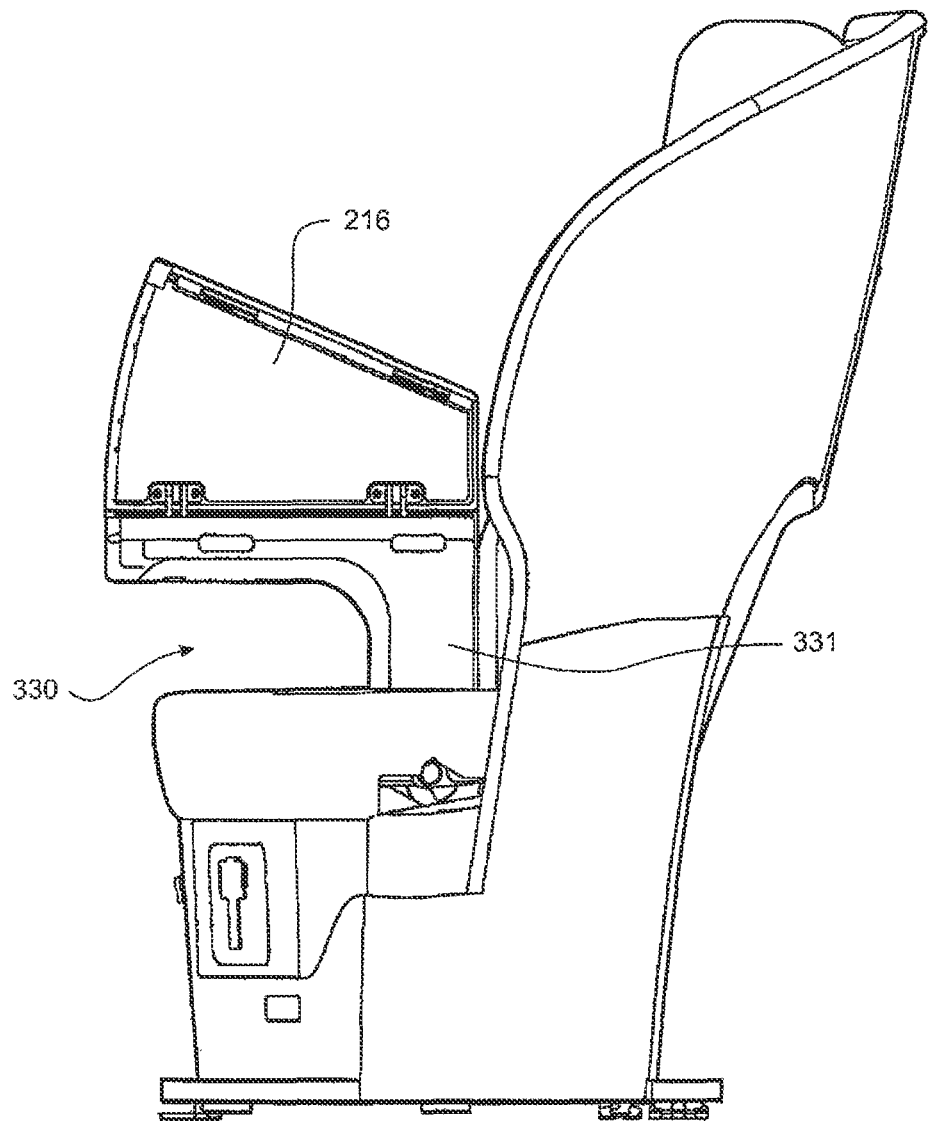
Figure 12:
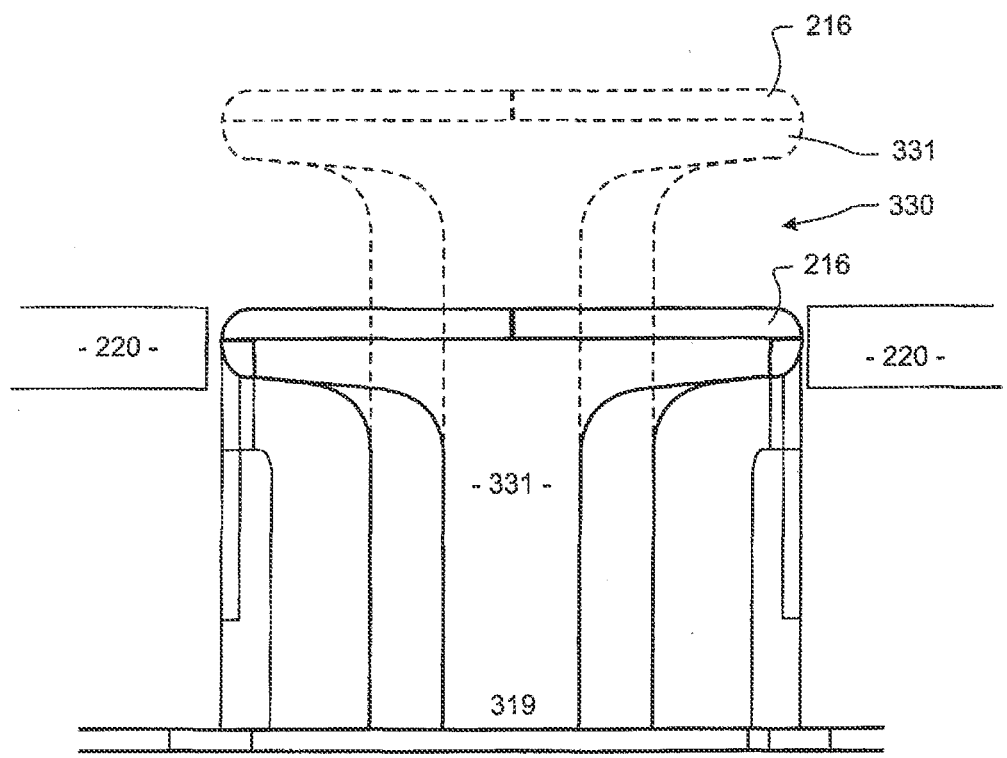
Figure 13:
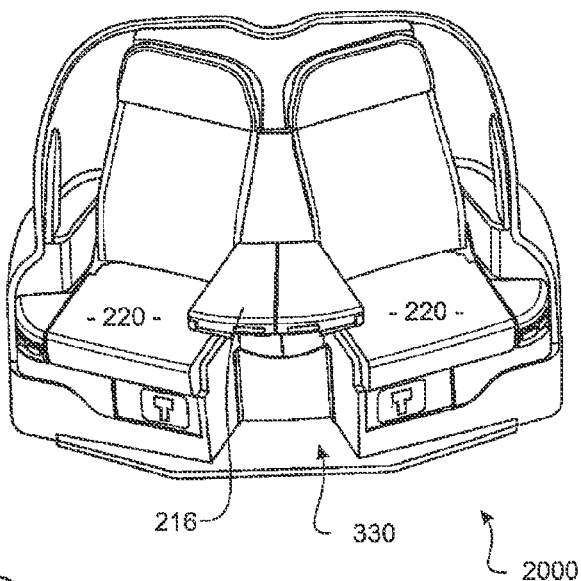
Figure 13A:
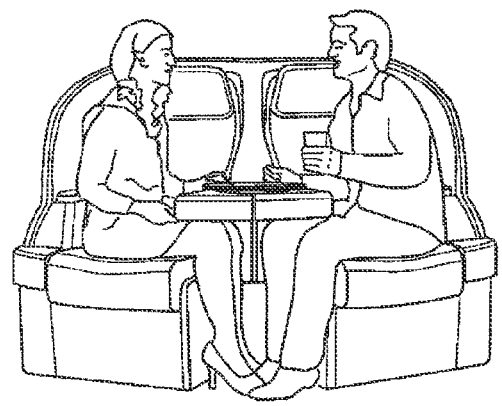
Figure 13B:
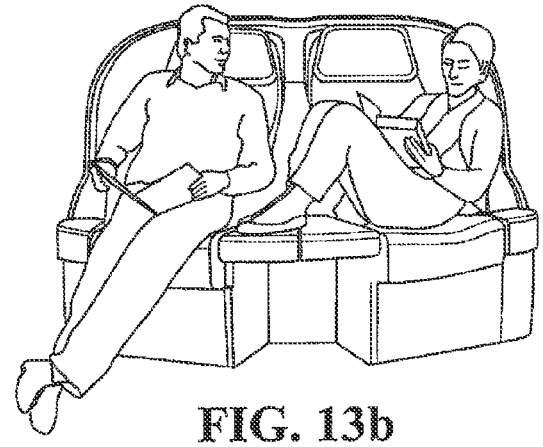
Figure 14:
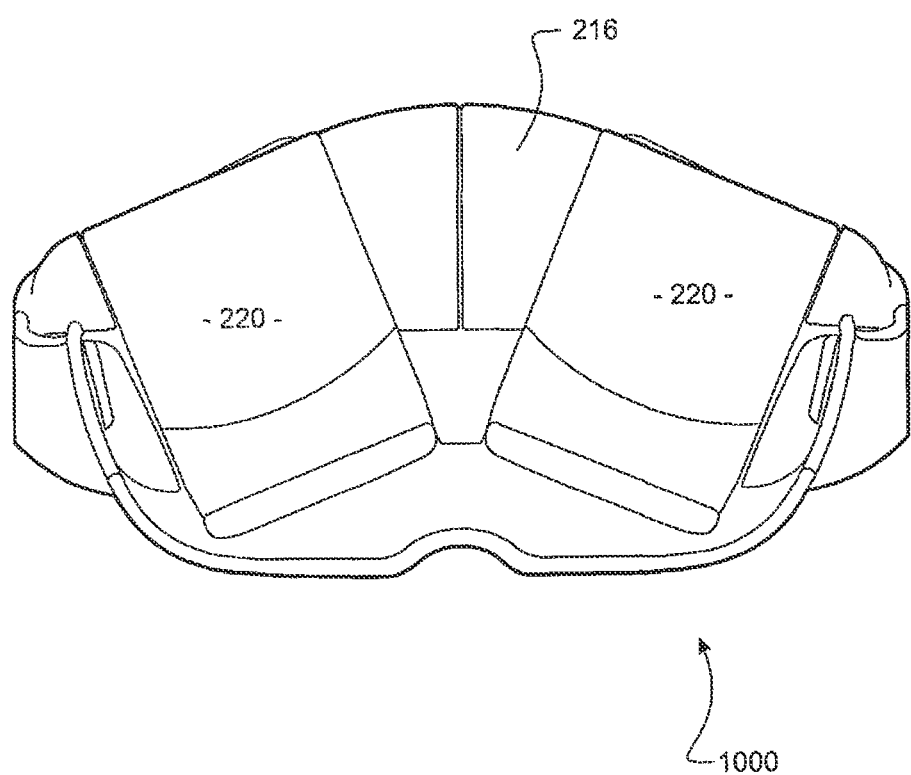
Figure 15:
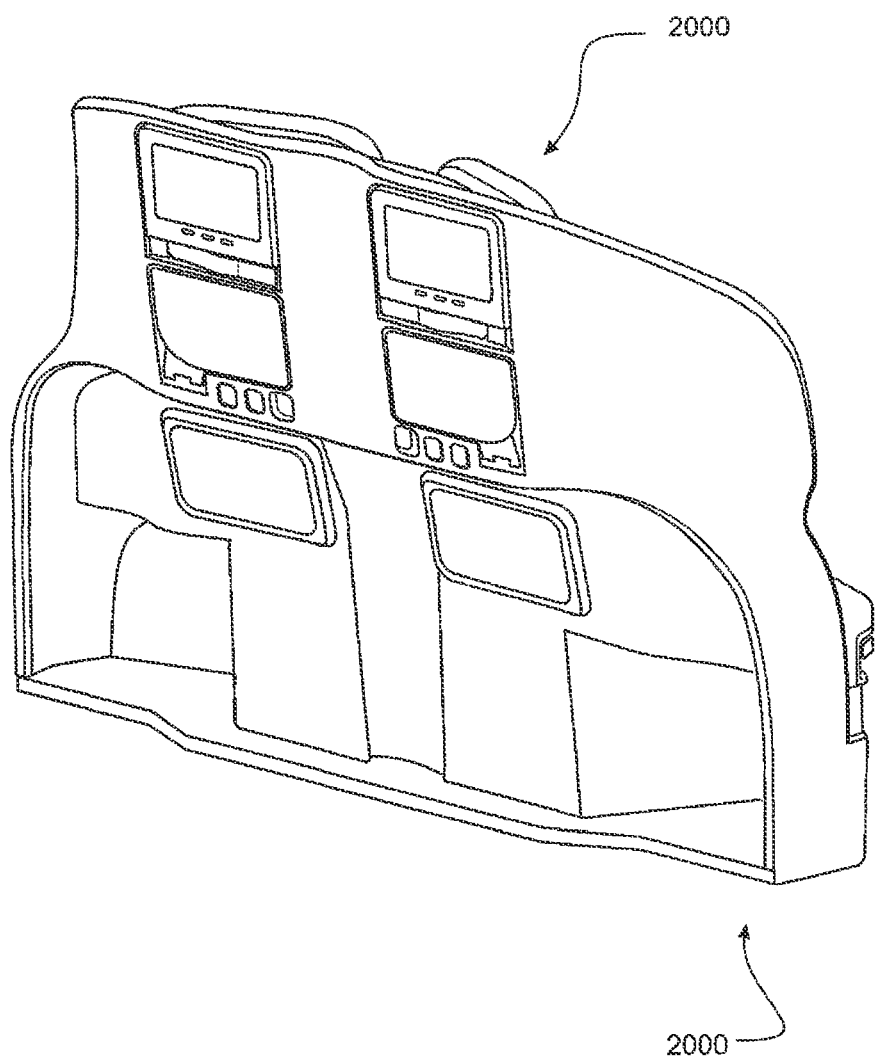
Figure 16:
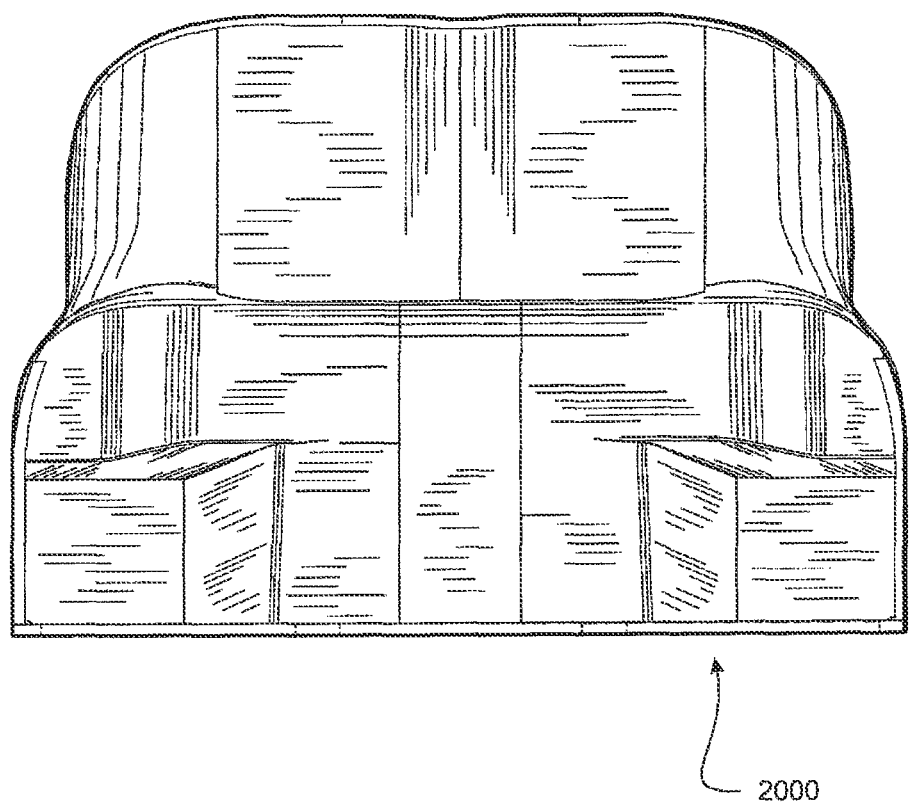
Figure 17:
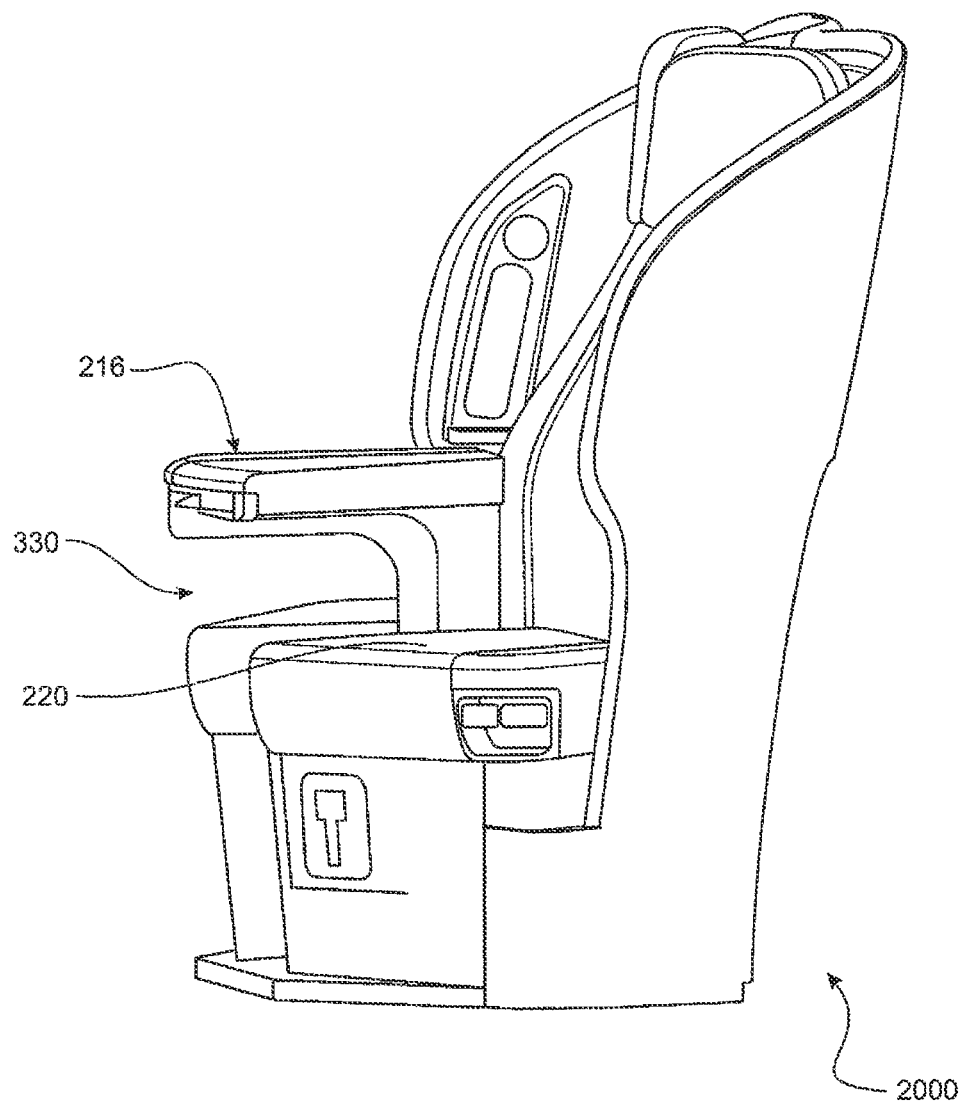
Figure 18:
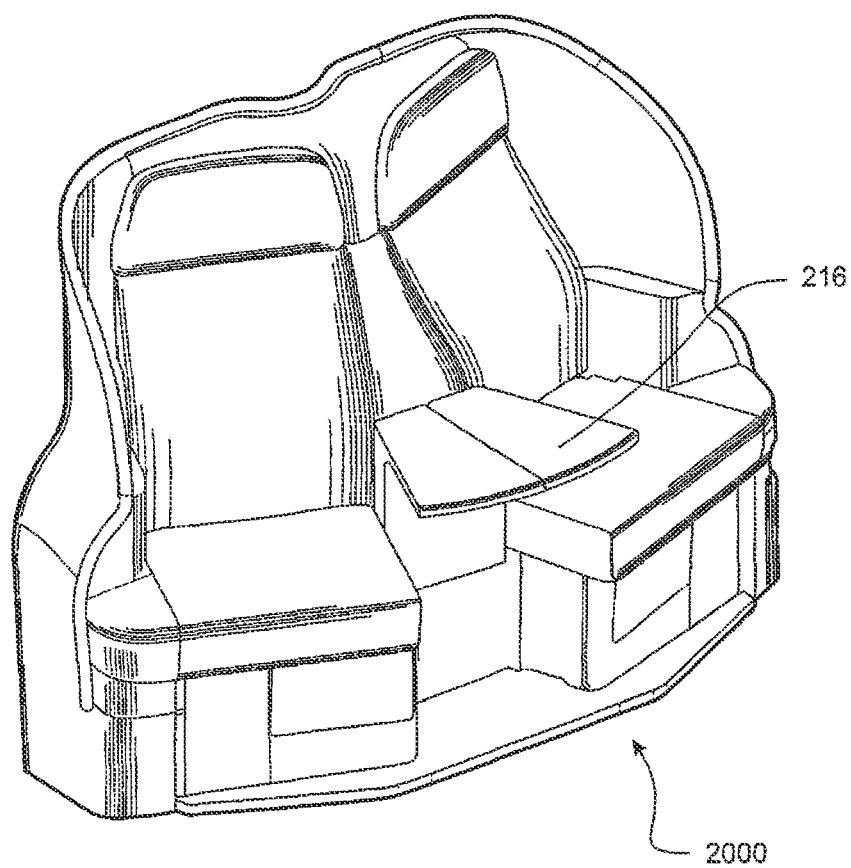
Figure 19:
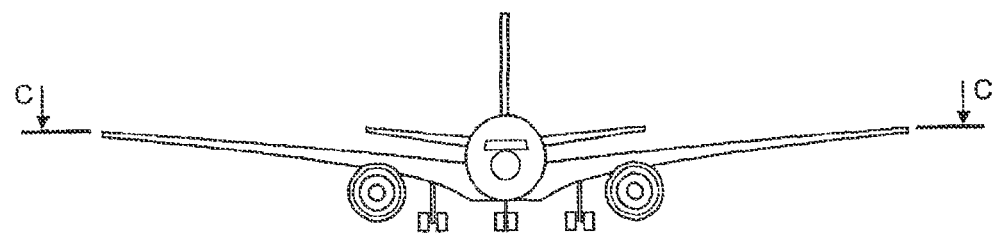
Figure 20:
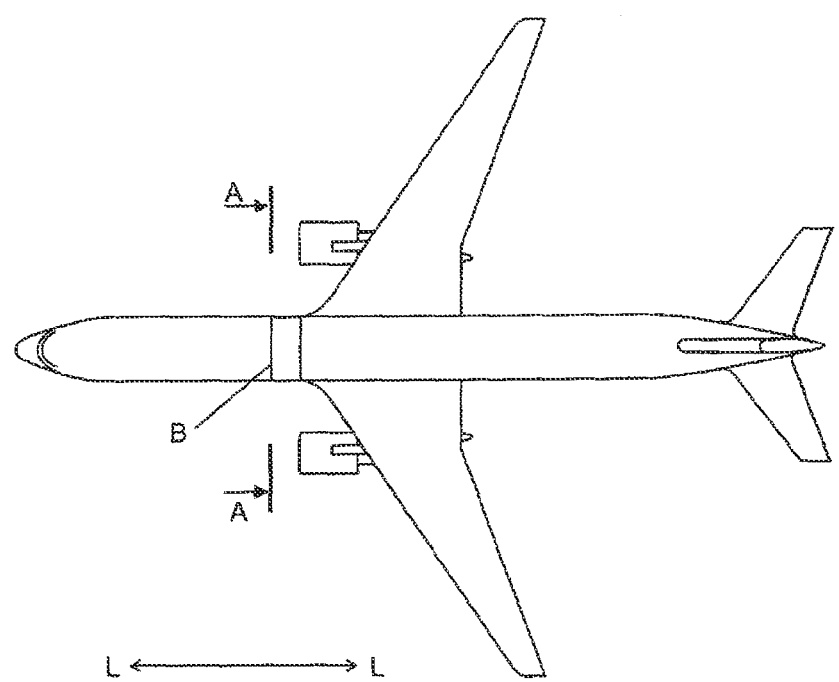
Figure 21:
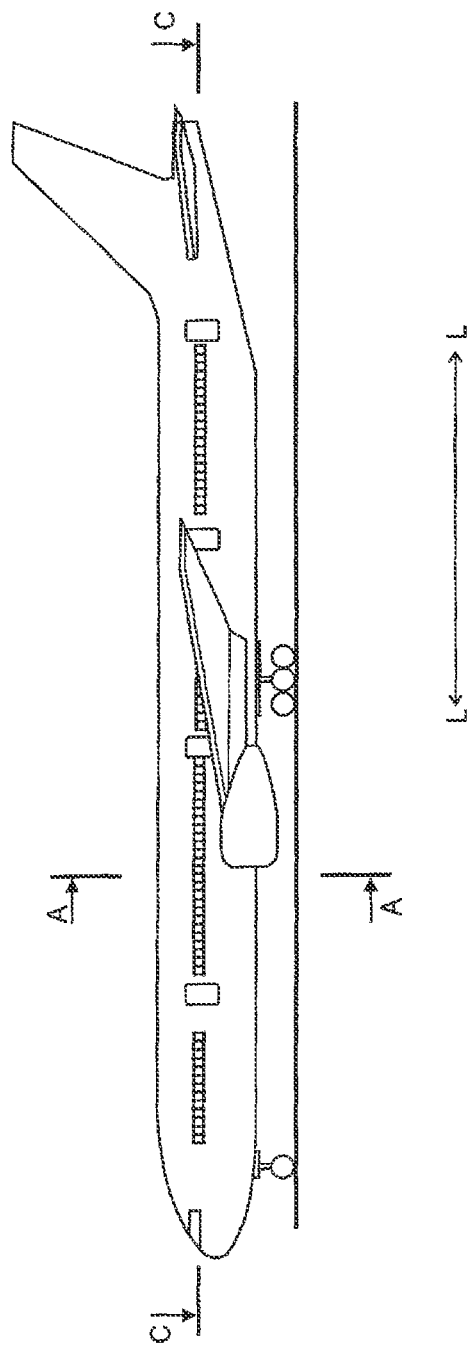
Figure 22:
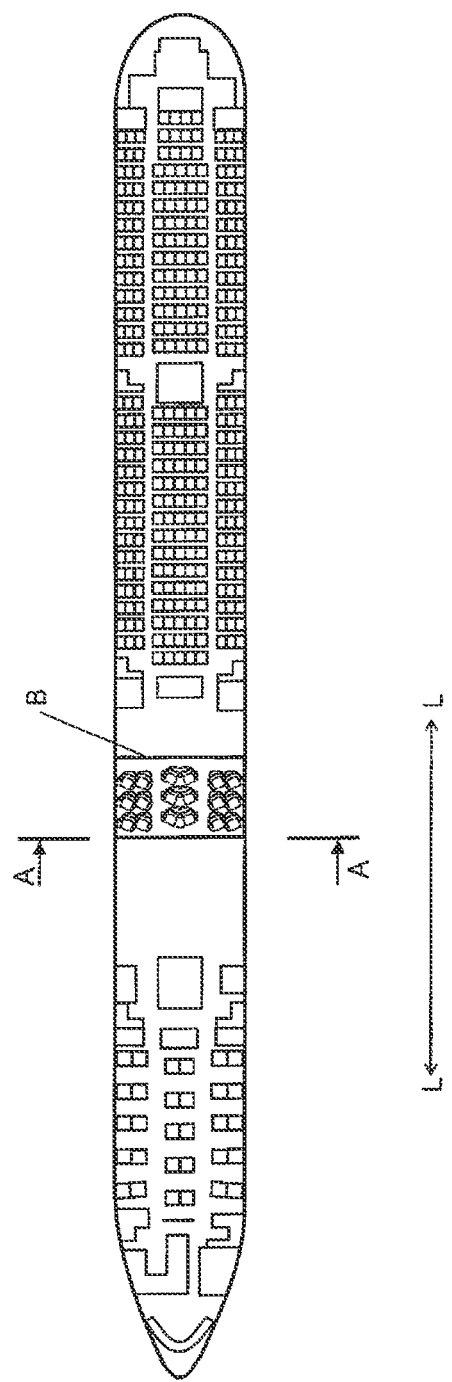
Figure 23:
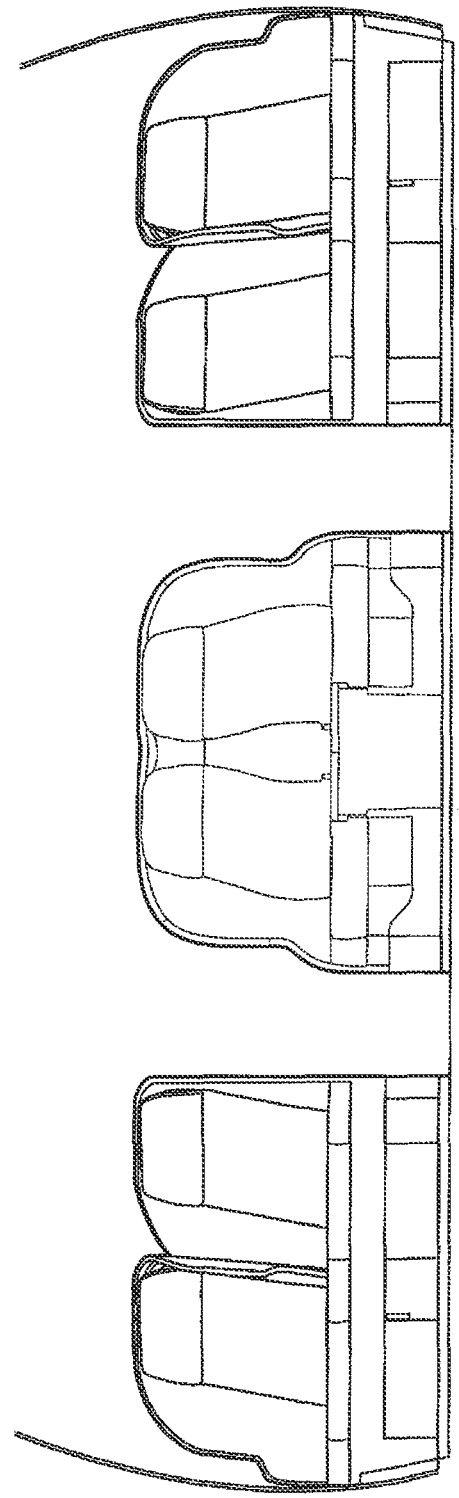

In another embodiment, the base structure 331 is preferably shaped so that when it is in the elevated position as shown in FIG. 11 and in phantom in FIG. 12, there is a void or gap 330 provided. This gap 330 may offer a passenger more effective space as at least part of a or both legs can fit into the gap.

When the base structure 331 is configured in its upper position, it is raisable to a height above the adjacent seat pans 224 that allows for a passenger to extend their legs underneath the utility surface and into the gap 330 between the respective seats 220. In this way, a pair of passengers can use the utility surface as a table surface, and sit facing each other with their legs extending under the utility surface.

The shell may flank around from the back of the seats toward the front and in part project beyond the back rests of each seats to present a secondary backrest for each passenger. Such a secondary back rest can be used when a passenger is positioned rotated more towards the other passenger.

Preferably, the inboard seat unit 200 further includes a central backrest disposed between the backrest portions of the respective seats 220, so that the utility surface can be used as an additional seat when the base structure is in its lower position, with the passenger leaning back on the central backrest.

The inboard seat unit 200 includes controls 280 for an in flight entertainment system and the like. These are mounted to the shell 210.

Similarly to the outboard seat unit 100, the inboard seat unit 200 includes a securing assembly 270 configured to secure the seats 220 to a floor 1111 of a commercial passenger vehicle.

Further, the inboard seat unit 200 includes a shell 210 extending at least in part around the rear of the seats 220, and which carries out similar functions to the shell 110 of the outboard seat unit 100. For example it may accommodate a display unit 230 at the rear of the shell 210 in a recess 212. The display unit is similar to that of the outboard seat unit 100, and similarly includes a viewing screen 232 and a pivoting arm 234 and is moveable in the same way.

The shell 210 is envisaged to be composed of a rigid moulded plastic or resinous material and is moulded to define at least one armrest 214 on the outboards side of the seats 220. The inboard seat unit 200 may include at least one tray table 240 foldable outwardly from an arm rest. It is also envisaged that the tray table 240 may extend from the rear of the shell 210 to provide a convenient utility surface for passengers seated behind.

In one embodiment the central seat arrangement 200 includes a privacy screen 250 extending from the shell 210 between the seats 220. In one embodiment, the privacy screen 250 is mounted in a fixed position relative to the shell. It may defined by the shell. In another embodiment, the privacy screen 250 is moveable so that it can be removed from between the seats 220.

Similarly to the outboard seat unit 100 the shell 210 also defines at least in part a foot well or pair of foot wells 260 to accommodate the feet of a passenger or passengers sitting behind the central seat arrangement 200.

Figure 3:
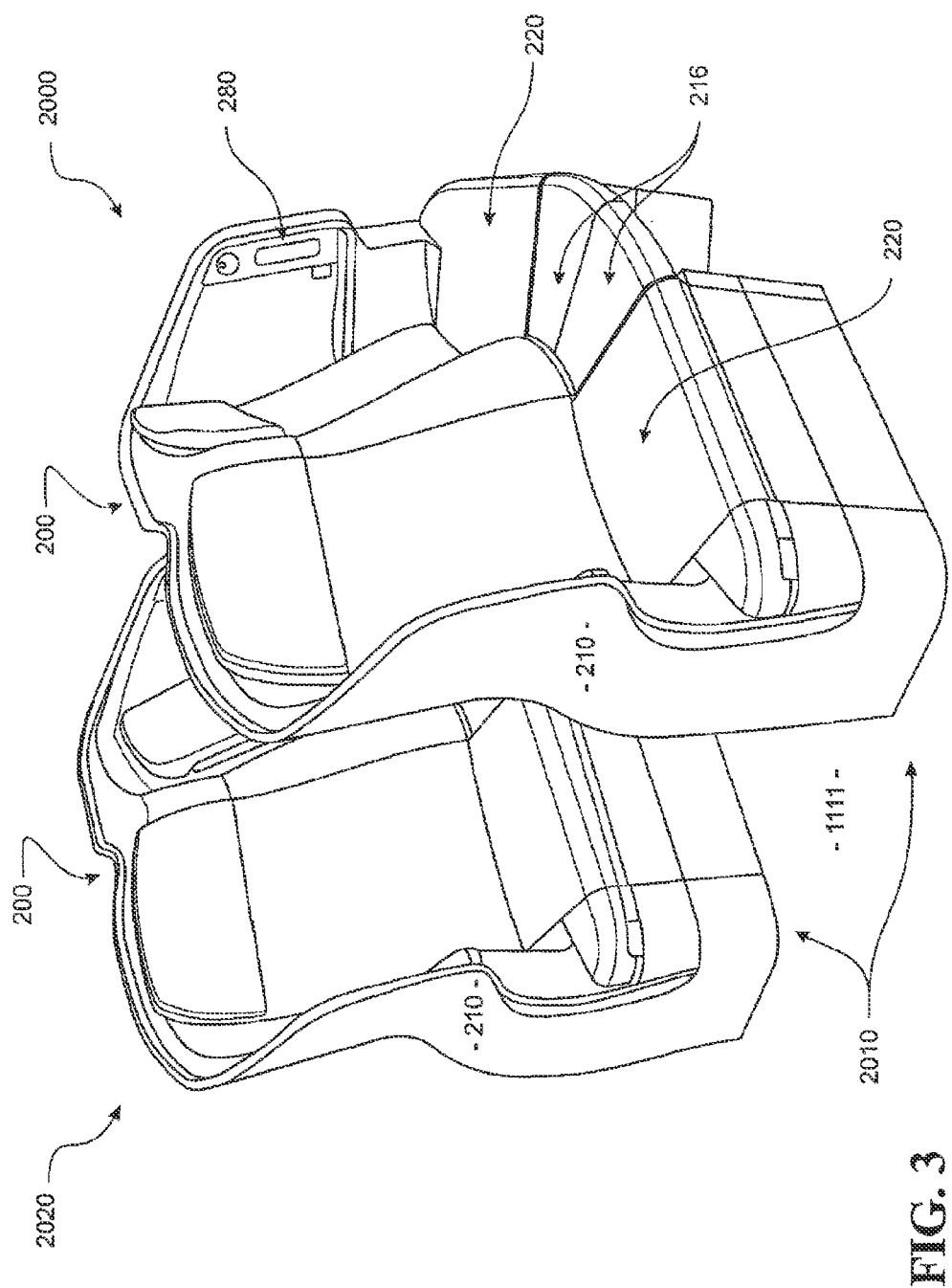
FIG. 3 is a front perspective view of two inboard seat units.
Figure 3A:
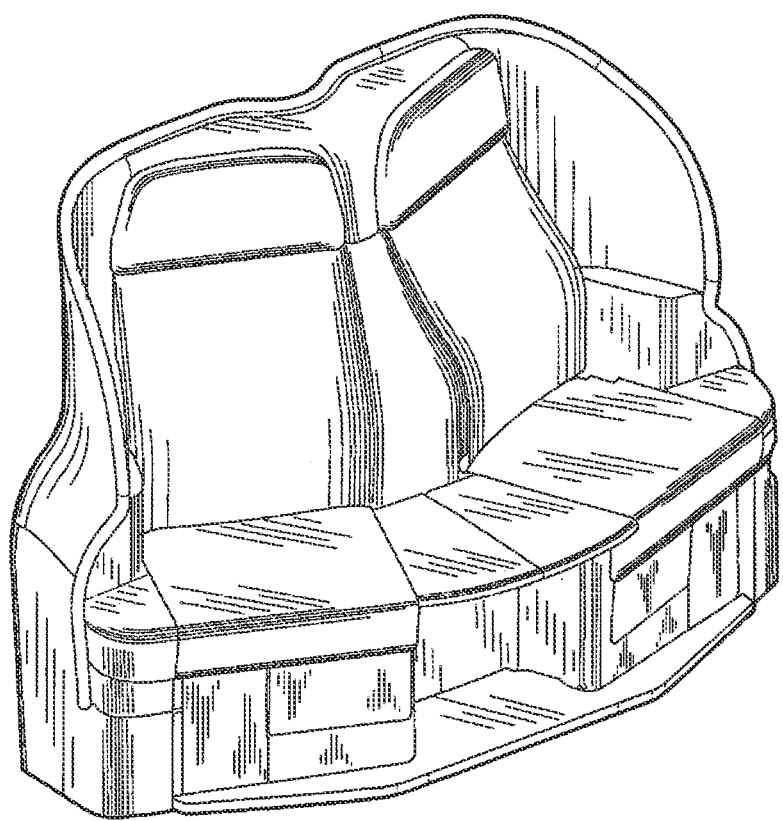
FIG. 3a is a front perspective view of one inboard seat unit.
Figure 4:
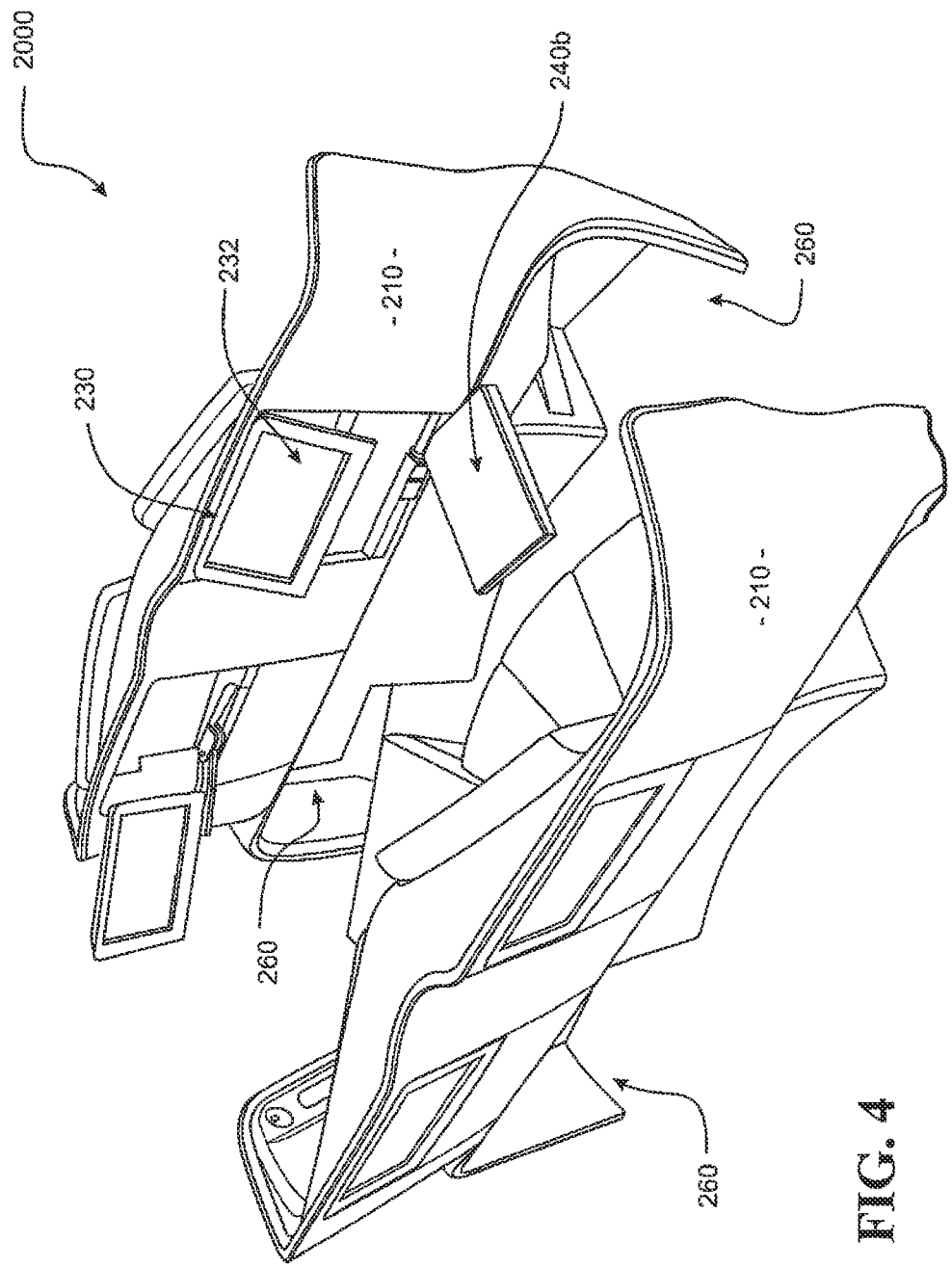
FIG. 4 is a rear perspective view of two inboard seat units.
Figure 5B:
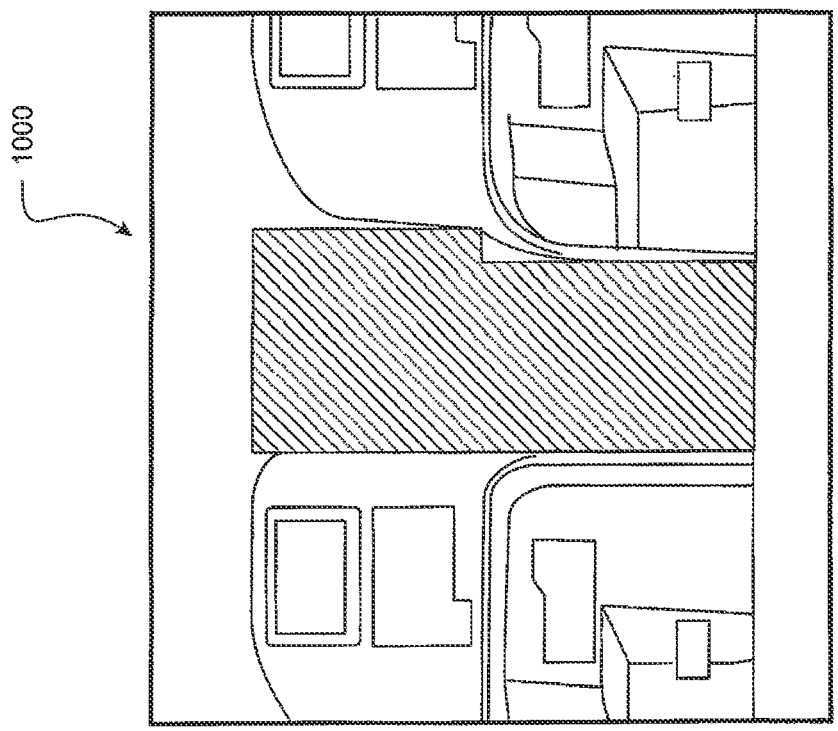
FIG. 5b is a rear view of a seating arrangement that shows the aisle size between outboard and inboard seat units.
Figure 5A:
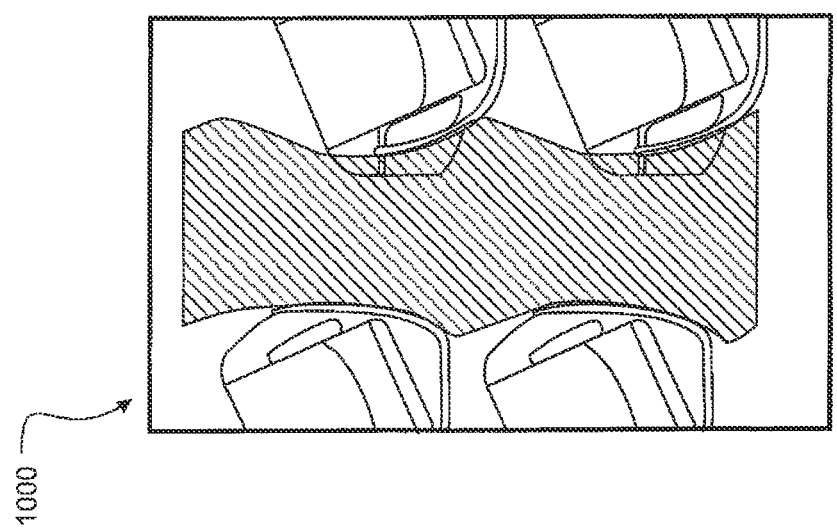
FIG. 5a is a plan view of a seating arrangement that shows the aisle size between outboard and inboard seat units.
Figure 6A:
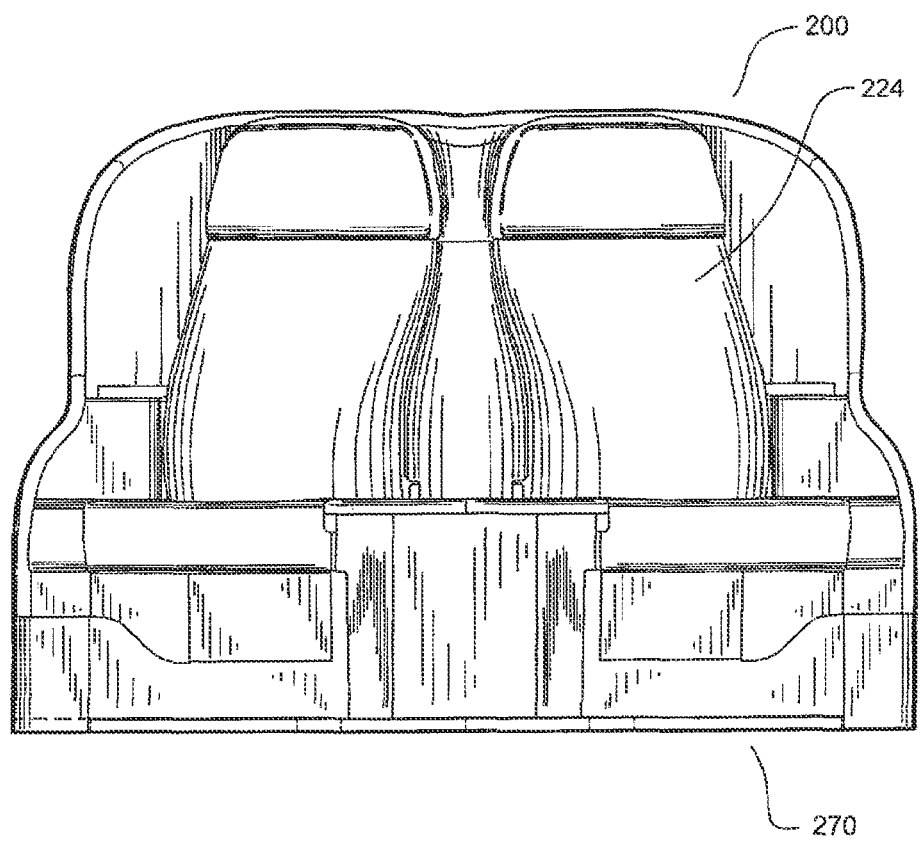
FIG. 6a is a front view of an inboard seat unit.
Figure 6B:
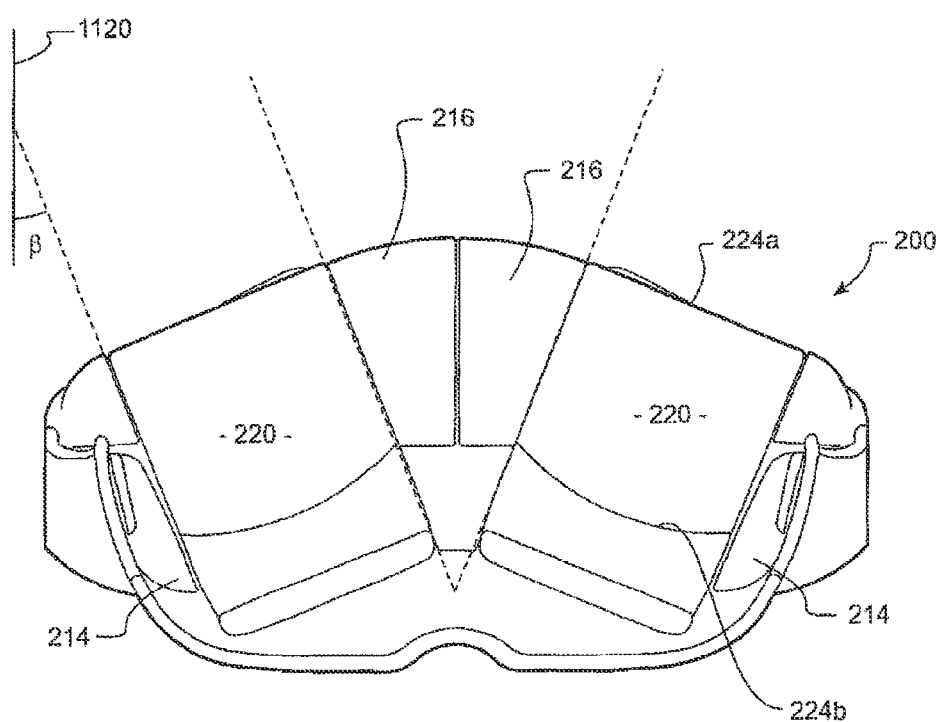
FIG. 6b is a plan view of an inboard seat unit.
Figure 6C:
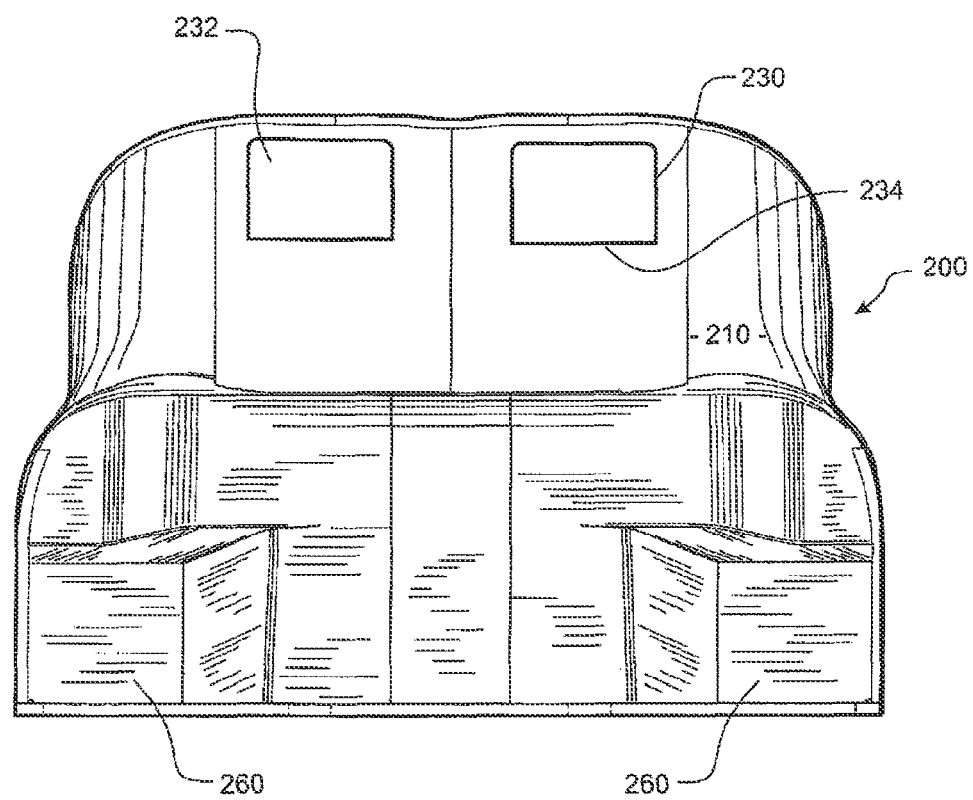
FIG. 6c is a rear view of an inboard seat unit.

As may be seen in FIG. 3, a commercial aircraft passenger inboard seating configuration 2000 can be defined within at least part of a section of the aircraft using the inboard seat unit 200 described above. The commercial aircraft passenger inboard seating configuration 2000 comprises a plurality of rows 2010 of inboard seat units 200, each unit comprising of two juxtaposed seats 120 behind which a shell 110 extends to separate the two seats 120 from a similar unit 200 located behind.

The two seats 120 each face in opposite outboard directions. Each unit 200 is located mid-ships of the aircraft.

In a preferred embodiment the plurality of rows 2010 are arranged in a column 2020, the column 2020 extending in a direction parallel to the longitudinal axis 1120 of the aircraft. The seats 120 of the unit 200 are closer together at or towards their backrests. Further, each seat 120 faces in a direction that is at an angle $\beta$ (shown in FIG. 6b) to the longitudinal axis of the aircraft and is preferably between 5 and 30 degrees to the longitudinal direction, and most preferably at about 23 degrees. It is envisaged that the angle $\beta$ will preferably be the same as the angle $\alpha$ that the seats 120 of the outboard seat unit 100 are at. This will help provide for privacy between passengers.

In a preferred embodiment, each seat 220 of the inboard seat unit 200 is located no more forward in the aircraft than the other seat in the inboard seat unit 200.

From the description above, it will be apparent that in use in an aircraft, the inboard seat unit will define a plurality of zones to accommodate two passengers in a sedentary position, wherein each zone is defined between and in part by a plurality of rows of inboard seat units, each comprising of two juxtaposed seats 220 on which a passenger can sit wherein the two seats each face in opposite outboard directions and wherein each zone nests in-part with an adjacent zone.

The invention may also provide a seating system including a central seating configuration 2000 and an outboard seating configuration 1000 as described above.

It is envisaged that the combination of the two seating configurations 1000 and 2000 can cooperate to provide good line-of-sight privacy for passengers accommodated in their seats, while providing comfort and efficient seat layout. Having a rigid shell also improves passenger comfort because passengers in seats behind can hold the shell when moving in and out of their seats, without shaking the backrest of the seat in front and hence annoying other passengers. The staggered offset of the outboard seat unit seats also avoids shoulder clashes between adjacent passengers.

Figure 28:
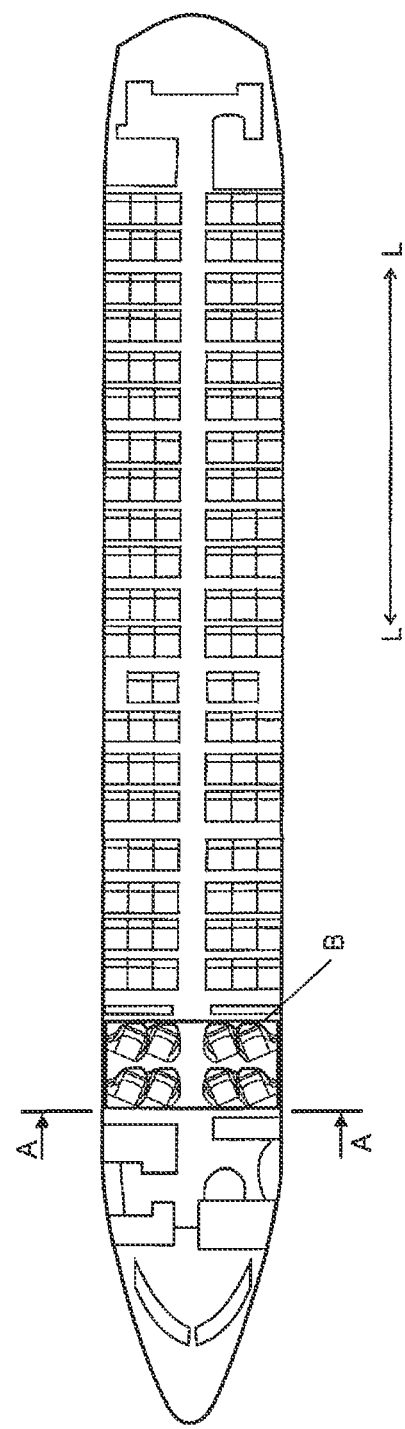
Figure 30:
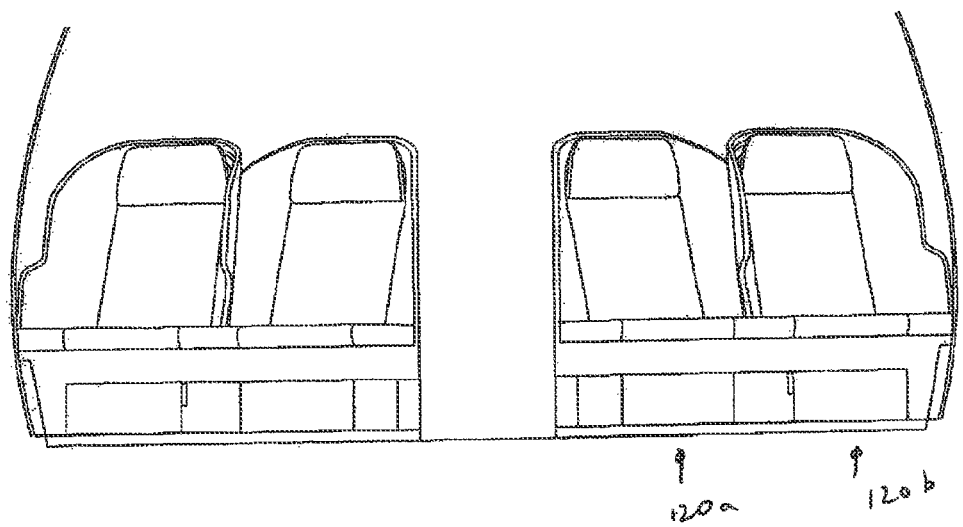

With reference to FIGS. 28 to 30, the outboard seat units may be provided in a section B of an aircraft and not in conjunction with the inboard seat units. For example the seats may be installed in a 2×2 arrangement on a narrow body aircraft such as a Boeing 737. Wherein an aisle separated the pairs of seats. The 2×2 arrangement may have adjacent pair of seats aligned in a row that extends perpendicular to the longitudinal direction LL or where a row of one pair of seats is slightly more advance of the row of a pair of seats on the opposite side of the aisle.

This may similarly apply to the seat units as shown in FIG. 24. For example a column of outboard seat units may have seats positioned slightly advance more inboard seat units of a particular row number in the aircraft. Indeed the pitch between seat units may be different between one or two rows.

The row direction of each seat unit in a column is parallel to each others. Likewise the row direction of seat units in one column is parallel to those of another column in the section of the vehicle where a plurality of the seat units described above are provided.

When combined in an aircraft, the advantages provided by the seating system are especially advantageous for passenger aircraft where extended travel times may be normal, and space and volume usage is critical.

Whilst reference herein has been made seats being provided as a unit, it is envisaged that seats could be mounted to a vehicle in an individual manner. Provision of a seat as a unit has advantages particularly for commercial passenger airlines where the seats, as a unit can be conveniently installed and secured to seat rails of an aircraft. This may be achieved by mounting the seats on a seat plinth that has securing fixtures to let it be secured to the seat rails.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

The invention claimed is:

1. A seating arrangement for location at a longitudinal centre line of a commercial passenger vehicle in a longitudinally extending passenger seating area thereof, said seating arrangement comprising;
    a pair of seats disposed alongside and secured to each other,
        each seat comprising
        a backrest portion, and
        a seat pan portion, wherein said seats face at an acute angle to each other, and wherein the backrest portions of the respective seats are nearer to a vertex of the acute angle than the seat pan portions;

said seating arrangement further comprising a utility surface between the seat pan portions, said utility surface having a raised position and a lowered position, wherein the utility surface and the seat pan portions define a continuous support surface when said utility surface is in the lowered position.

2. A seating arrangement as claimed in claim 1 wherein the seat pan portions of each seat are separated from each other and an armrest is located between the seat pan portions of the pair of seats.

3. A seating arrangement as claimed in claim 2 wherein the armrest is configured to be presented for mutual use by passengers sedentary in the pair of seats.

4. A seating arrangement as claimed in claim 1 wherein the utility surface is supported by a base structure in a manner to be movable between the raised position and the lowered position, and wherein the utility surface when in its raised position is configured for a passenger sedentary in one or each of the respective seats to rest their arm on.

5. A seating arrangement as claimed in claim 4 wherein the utility surface when in its lowered position and together with the seat pans of each seat, form a surface for a passenger to recline on.

6. A seating arrangement as claimed in claim 4 wherein the utility surface, when in its raised position, allows passengers sitting in the two seats to position their feet under the utility surface in order to sit in an orientation facing towards each other.

7. A seating arrangement as claimed in claim 4 wherein the utility surface is supported by said base structure in a manner to be movable between said raised and lowered positions, said base structure configured to not prevent sedentary passengers legs from swinging into and out of a region underneath the utility surface when the utility surface is in the raised position.

8. A seating arrangement as claimed in claim 1 wherein a backrest is disposed between the backrest portions of the two seats, presented for use by a passenger sitting on the utility surface when in its lowered position.

9. A seating arrangement as claimed in claim 1 wherein the utility surface when in its lowered position forms a secondary seat pan positioned intermediate of and spanning between the seat pans of the two seats, there being a void below said secondary seat pan, and wherein in the raised position the utility surface is separated from the seat pans of the two seats to create a gap sufficient to receive at least one thigh of a person sitting in each of the two seats.

10. A seating arrangement as claimed in claim 1 further comprising a shell that extends at least in part around the rear of both seats, and
wherein the shell is composed of a rigid moulded plastic material.

11. A seating arrangement as claimed in claim 10 wherein the shell defines a recess for accommodating a visual display unit to be presented for viewing by a passenger seated behind the seating arrangement.

12. A seating arrangement as claimed in claim 10 wherein the shell defines at least one armrest for each seat.

13. A seating arrangement as claimed in claim 10 wherein said shell extends from floor level and projects above the backrest portion of each seat.

14. A seating arrangement as claimed in claim 10, wherein at least one tray table is provided to extend outwardly at the rear of the shell to provide a utility surface for a passenger seated behind the seating arrangement.

15. A seating arrangement as claimed in claim 10 wherein the shell defines at least one foot well to accommodate the feet of a passenger sitting behind the seating arrangement.

16. A seating arrangement as claimed in claim 15 wherein the foot well is of a shape to allow a passenger sitting behind the seating arrangement to position their feet below the seat pan of a seat in front.

17. A seating arrangement as claimed in claim 15 wherein said shell extends to present a secondary back rest for sedentary passengers in each seat for use by each passenger when positioned to face more towards the other seat in the seating arrangement.

18. A seating configuration as claimed in claim 15 wherein the foot well is fully enclosed other than at where the feet of a passenger are received into the foot well.

19. A seating arrangement as claimed in claim 1 wherein each said seat faces at an angle relative to the longitudinal centre line of between 15 to 30 degrees.

20. A seating arrangement as claimed in claim 1 wherein one or both of the backrest portion and seat pan portion is moveable between an upright seated position and a more reclined position.

21. A seating arrangement as claimed in claim 1 wherein said seats are connected to each other and form a unitary pair of seats.

22. A seating unit as claimed in claim 1 wherein the utility surface comprises a first utility surface associated with a first of said seats and that can be moved between a first condition wherein the first utility surface offers an arm rest to a passenger sedentary in said first seat and a second condition wherein the first utility surface is flush with the seat pan portion of the first seat, and a second utility surface associated with a second of said seats and that can be moved between a first condition wherein the second utility surface offers an arm rest to a passenger sedentary in said second seat and a second condition wherein the second utility surface is flush with the seat pan portion of the second seat.

23. A seating unit as claimed in claim 1 wherein the utility surface comprises a first utility surface associated with a first of said seats and that can be moved between a first condition wherein the first utility surface offers a table to a passenger sedentary in said first seat and a second condition wherein the first utility surface is flush with the seat pan portion of the first seat, and a second utility surface associated with a second of said seats and that can be moved between a first condition wherein the second utility surface offers a table to a passenger sedentary in said second seat and a second condition wherein the second utility surface is flush with the seat pan portion of the second seat.

24. A seating arrangement as claimed in claim 1 wherein a storage area is provided below the utility surface that can receive and store a passenger's personal belongings.

25. A seating arrangement as claimed in claim 1 wherein each said seat faces at an angle relative to the longitudinal centre line of 23 degrees.

* * * * *